(12) United States Patent
Machkaoutsan et al.

(10) Patent No.: US 9,793,164 B2
(45) Date of Patent: Oct. 17, 2017

(54) SELF-ALIGNED METAL CUT AND VIA FOR BACK-END-OF-LINE (BEOL) PROCESSES FOR SEMICONDUCTOR INTEGRATED CIRCUIT (IC) FABRICATION, AND RELATED PROCESSES AND DEVICES

(71) Applicant: QUALCOMM Incorporated, San Diego, CA (US)

(72) Inventors: Vladimir Machkaoutsan, Wezemaal (BE); Stanley Seungchul Song, San Diego, CA (US); John Jianhong Zhu, San Diego, CA (US); Junjing Bao, San Diego, CA (US); Jeffrey Junhao Xu, San Diego, CA (US); Mustafa Badaroglu, Leuven (BE); Matthew Michael Nowak, San Diego, CA (US); Choh Fei Yeap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/939,561

(22) Filed: Nov. 12, 2015

(65) Prior Publication Data

US 2017/0140986 A1 May 18, 2017

(51) Int. Cl.
*G06F 17/50* (2006.01)
*G06F 19/00* (2011.01)
(Continued)

(52) U.S. Cl.
CPC .... *H01L 21/76897* (2013.01); *G06F 17/5077* (2013.01); *H01L 21/76816* (2013.01);
(Continued)

(58) Field of Classification Search
CPC ............ G06F 2217/12; G06F 17/5068; G06F 17/5077; G06F 19/00; H01L 21/76897;
(Continued)

(56) References Cited

U.S. PATENT DOCUMENTS 4,836,885 A * 6/1989 Breiten ............. H01L 21/31055
204/192.37
4,888,300 A * 12/1989 Burton ............. H01L 21/30604
148/DIG. 116
(Continued)

FOREIGN PATENT DOCUMENTS

WO 2015026342 A1 2/2015

OTHER PUBLICATIONS

International Search Report and Written Opinion for PCT/US2016/061346, dated Feb. 2, 2017, 16 pages.

*Primary Examiner* — Phallaka Kik
(74) *Attorney, Agent, or Firm* — Withrow & Terranova, PLLC

(57) ABSTRACT

Self-aligned metal cut and via for Back-End-Of-Line (BEOL) processes for semiconductor integrated circuit (IC) fabrication, and related processes and devices, is disclosed. In this manner, mask placement overlay requirements can be relaxed. This relaxation can be multiples of that allowed by conventional BEOL techniques. This is enabled through application of different fill materials for alternating lines in which a conductor will later be placed. With these different fill materials in place, a print cut and via mask is used, with the mask allowed to overlap other adjacent fill lines to that of the desired line. Etching is then applied that is selective to the desired line but not adjacent lines.

19 Claims, 25 Drawing Sheets

(51) Int. Cl.
- *H01L 21/00* (2006.01)
- *H01L 23/00* (2006.01)
- *H01L 21/768* (2006.01)
- *H01L 23/532* (2006.01)
- *H01L 21/302* (2006.01)
- *H01L 21/461* (2006.01)
- *H01L 21/311* (2006.01)

(52) U.S. Cl.
CPC .... *H01L 23/53228* (2013.01); *G06F 17/5068* (2013.01); *G06F 19/00* (2013.01); *G06F 2217/12* (2013.01); *H01L 21/302* (2013.01); *H01L 21/311* (2013.01); *H01L 21/461* (2013.01)

(58) Field of Classification Search
CPC ............. H01L 21/76816; H01L 21/311; H01L 21/302; H01L 21/461; H01L 23/53228
USPC ......... 716/55, 54; 700/120, 121; 438/23, 22, 438/48, 129, 229, 320, 339, 694, 689, 438/705, 738; 430/4, 5; 378/34, 35
See application file for complete search history.

(56) References Cited

U.S. PATENT DOCUMENTS

| | | | |
|---|---|---|---|
| 5,155,657 A * | 10/1992 | Oehrlein | H01L 21/3065 257/298 |
| 5,244,837 A * | 9/1993 | Dennison | H01L 21/76801 257/E21.576 |
| 5,605,600 A * | 2/1997 | Muller | H01L 21/3065 216/37 |
| 6,025,208 A * | 2/2000 | Chui | B81C 1/00166 438/50 |
| 6,037,262 A * | 3/2000 | Hsia | H01L 21/76808 257/E21.579 |
| 6,159,761 A * | 12/2000 | Okada | G01P 15/0802 438/462 |
| 6,169,024 B1 * | 1/2001 | Hussein | H01L 21/76807 257/E21.579 |
| 6,225,207 B1 * | 5/2001 | Parikh | H01L 21/76808 257/E21.579 |
| 6,245,655 B1 * | 6/2001 | Moslehi | H01L 21/76879 257/E21.586 |
| 6,417,106 B1 * | 7/2002 | Twu | H01L 21/76829 257/E21.576 |
| 6,426,253 B1 * | 7/2002 | Tews | H01L 21/76237 257/E21.551 |
| 6,607,967 B1 * | 8/2003 | Pallinti | H01L 21/31053 257/E21.244 |
| 6,617,251 B1 * | 9/2003 | Kamath | H01L 21/31055 257/E21.245 |
| 6,620,715 B1 * | 9/2003 | Blosse | H01L 21/0337 257/E21.038 |
| 6,777,307 B1 * | 8/2004 | Ramkumar | H01L 21/3081 257/E21.232 |
| 6,794,269 B1 * | 9/2004 | Gopalan | H01L 21/76202 257/E21.552 |
| 6,969,684 B1 * | 11/2005 | Gilboa | H01L 21/31053 257/E21.244 |
| 7,119,006 B2 * | 10/2006 | Kraft | H01L 21/76808 257/E21.579 |
| 7,531,460 B2 * | 5/2009 | Iijima | H01L 21/3065 438/706 |
| 7,867,693 B1 * | 1/2011 | Mieher | G03F 7/70466 430/270.1 |
| 8,003,466 B2 | 8/2011 | Shi et al. | |
| 8,313,967 B1 * | 11/2012 | Lee | H01L 21/02381 257/200 |
| 8,455,932 B2 | 6/2013 | Khakifirooz et al. | |
| 8,875,067 B2 | 10/2014 | Hsu et al. | |
| 8,921,136 B2 | 12/2014 | Chen et al. | |
| 9,041,217 B1 | 5/2015 | Bristol et al. | |
| 9,054,164 B1 | 6/2015 | Jezewski et al. | |
| 9,524,974 B1 * | 12/2016 | Kanezaki | H01L 27/11524 |
| 2003/0049893 A1 * | 3/2003 | Currie | H01L 21/76224 438/172 |
| 2004/0100779 A1 * | 5/2004 | Kraft | H01L 21/76808 361/760 |
| 2004/0127016 A1 * | 7/2004 | Hoog | H01L 21/76801 438/637 |
| 2005/0073021 A1 * | 4/2005 | Gabriel | H01L 21/76224 257/510 |
| 2006/0216906 A1 * | 9/2006 | Smythe | H01L 21/02164 438/438 |
| 2009/0072307 A1 * | 3/2009 | Kim | H01L 21/823456 257/334 |
| 2009/0137093 A1 * | 5/2009 | Lin | H01L 27/10876 438/421 |
| 2009/0213656 A1 * | 8/2009 | Ku | H01L 27/11568 365/185.13 |
| 2009/0243116 A1 * | 10/2009 | Feustel | H01L 21/76807 257/773 |
| 2009/0275162 A1 * | 11/2009 | Papageorgiou | B81C 1/00246 438/50 |
| 2009/0294840 A1 * | 12/2009 | Gilgen | H01L 21/823431 257/327 |
| 2013/0020708 A1 * | 1/2013 | Purayath | H01L 21/76885 257/761 |
| 2013/0200786 A1 * | 8/2013 | Meinhold | H01J 9/02 313/586 |
| 2013/0221355 A1 * | 8/2013 | Bower | H01L 21/6835 257/48 |
| 2014/0077305 A1 * | 3/2014 | Pethe | H01L 21/76895 257/368 |
| 2015/0171010 A1 | 6/2015 | Bristol et al. | |
| 2015/0214094 A1 | 7/2015 | Jezewski et al. | |
| 2017/0092371 A1 * | 3/2017 | Harari | G11C 16/3431 |

\* cited by examiner

SELF-ALIGNED METAL CUT AND VIA FOR BACK-END-OF-LINE (BEOL) PROCESSES FOR SEMICONDUCTOR INTEGRATED CIRCUIT (IC) FABRICATION, AND RELATED PROCESSES AND DEVICES

BACKGROUND

I. Field of the Disclosure

This disclosure relates generally to fabrication of semiconductor integrated circuits (ICs), and, more specifically, to Damascene and dual-Damascene fabrication using self-aligned metal cut and via techniques.

II. Background

Semiconductor fabrication techniques often use photoresist masking and plasma etching, though plasma etching is better suited to aluminum conductive structures than those that use copper. Copper and similar metal structures, however, enable higher performance and smaller node sizes than aluminum, and thus plasma etching has been replaced with Damascene and dual-Damascene processing techniques. Within this Damascene-processing context, Back-End-Of-Line (BEOL) processing is used to create interconnections, and, in scaled technology nodes (e.g., 14 nanometer (nm) and 10 nm), tight overlay margins for metal cut and via placement are required. With conventional BEOL processing, such as a 193i (193 nm ultraviolet light with liquid immersion) scheme or e-beam/EUV, it is not possible, however, to print many patterns needed for these scaled technology nodes. A traditional mask, for example, requires a round via with a tight overlay (OVL) margin that is difficult or impossible to use at these scales. Furthermore, a traditional cut also requires a tight OVL margin, which is similarly difficult. However, without these tight margins, resulting interconnection structures are unreliable or unusable. Therefore, conventional BEOL processing fails to adequately perform in scaled technology nodes.

SUMMARY OF THE DISCLOSURE

Aspects disclosed herein include self-aligned metal cut and via for Back-End-Of-Line (BEOL) processes for semiconductor integrated circuit (IC) fabrication, and related processes and devices.

In an exemplary aspect, a method for providing a metallic interconnection layer is disclosed. The method comprises patterning and filling, using a two-dimension-capable multi-patterning process, alternating first and second sets of lines. The first set of lines and the second set of lines have first and second materials, respectively. The first and second materials have different etch characteristics. The method also comprises patterning first self-aligned cuts for the first set of lines. The first self-aligned cuts have an overlay margin permitting the first self-aligned cuts to overlap one or more neighboring lines of the second set of lines. The method also comprises selectively etching, due to the first and second materials having different etch characteristics, the first and second sets of lines and the first self-aligned cuts to remove the first set of lines other than portions of the first set of lines protected by the first self-aligned cuts but not the second set of lines and to provide first trenches at the first set of lines other than the portions of the first set of lines protected by the first self-aligned cuts. The method further comprises filling the first trenches with a third material having different etch characteristics than the second material. The method also comprises patterning second self-aligned cuts for the second set of lines. The second self-aligned cuts have an overlay margin permitting the second self-aligned cuts to overlap one or more neighboring tranches of the first trenches. The method further comprises selectively etching, due to the second and third materials having different etch characteristics, the second set of lines, the first trenches, and the second self-aligned cuts to remove the second set of lines other than portions of the second set of lines protected by the second self-aligned cuts but not the first trenches and to provide second trenches at the second set of lines other than the portions of the second set of lines protected by the second self-aligned cuts. The method also comprises filling the second trenches with a fourth material having different etch characteristics than the third material. The method also comprises patterning first self-aligned vias for the first or second trenches with a relaxed overlay margin. The relaxed overlay margin permits the first self-aligned vias to overlap one or more neighboring trenches of the first or second trenches. The method further comprises selectively etching, due to the first and second trenches having the third and fourth materials having different etch characteristics, to provide first via holes. The method also comprises stripping fill materials in the first and second trenches to provide a stripped pattern, and forming conductive lines and vias in the stripped pattern to provide the metallic interconnection layer for the semiconductor die.

In another exemplary aspect, one or more non-transitory computer-readable storage media having instructions stored thereon. The instructions, responsive to execution by one or more computer processors, perform operations comprising patterning and filling, using a two-dimension-capable multi-patterning process, alternating first and second sets of lines. The first set of lines and the second set of lines have first and second materials, respectively. The first and second materials have different etch characteristics. The operations also comprise patterning first self-aligned cuts for the first set of lines. The first self-aligned cuts have an overlay margin permitting the first self-aligned cuts to overlap one or more neighboring lines of the second set of lines. The operations also comprise selectively etching, due to the first and second materials having different etch characteristics, the first and second sets of lines and the first self-aligned cuts to remove the first set of lines other than portions of the first set of lines protected by the first self-aligned cuts but not the second set of lines and to provide first trenches at the first set of lines other than the portions of the first set of lines protected by the first self-aligned cuts. The operations further comprise filling the first trenches with a third material having different etch characteristics than the second material. The operations also comprise patterning second self-aligned cuts for the second set of lines. The second self-aligned cuts have an overlay margin permitting the second self-aligned cuts to overlap one or more neighboring trenches of the first trenches. The operations also comprise selectively etching, due to the second and third materials having different etch characteristics, the second set of lines, the first trenches, and the second self-aligned cuts to remove the second set of lines other than portions of the second set of lines protected by the second self-aligned cuts but not the first trenches and to provide second trenches at the second set of lines other than the portions of the second set of lines protected by the second self-aligned cuts. The operations further comprise filling the second trenches with a fourth material having different etch characteristics than the third material. The operations also comprise patterning first self-aligned vias for the first or second trenches with a relaxed overlay margin. The relaxed overlay margin permits the first self-aligned vias to overlap one or more neighboring trenches of the first or second trenches. The operations further comprise selectively etching, due to the first and second trenches having the third and fourth materials having different etch characteristics, to provide first via holes. The operations further comprise stripping fill materials in the first and second trenches to provide a stripped pattern, and forming conductive lines and vias in the stripped pattern to provide a metallic interconnection layer for a semiconductor die.

In another exemplary aspect, an electronic device for integrated circuit (IC) fabrication is provided. The electronic device comprises means for placing a mask, means for scanning, and means for managing. The means for managing is capable of controlling the means for placing the mask. The means for placing the mask has a maximum placement-accuracy value at which the means for placing the mask is capable of placing a photolithography mask. The means for managing is also capable of controlling the means for scanning. The means for scanning has a maximum scanner-accuracy value at which the means for scanning is capable of patterning a resist through holes or transparencies in the photolithography mask. The means for managing is also capable of forming, using the means for placing the mask and the means for scanning, metal cuts or vias using the holes or transparencies in the photolithography mask where the holes or transparencies have an overlay margin that is half or more of a pitch of lines from which the metal cuts or vias will later be formed and that is larger than a sum of the maximum placement-accuracy value and the maximum scanner-accuracy value.

DETAILED DESCRIPTION

Figure 1:
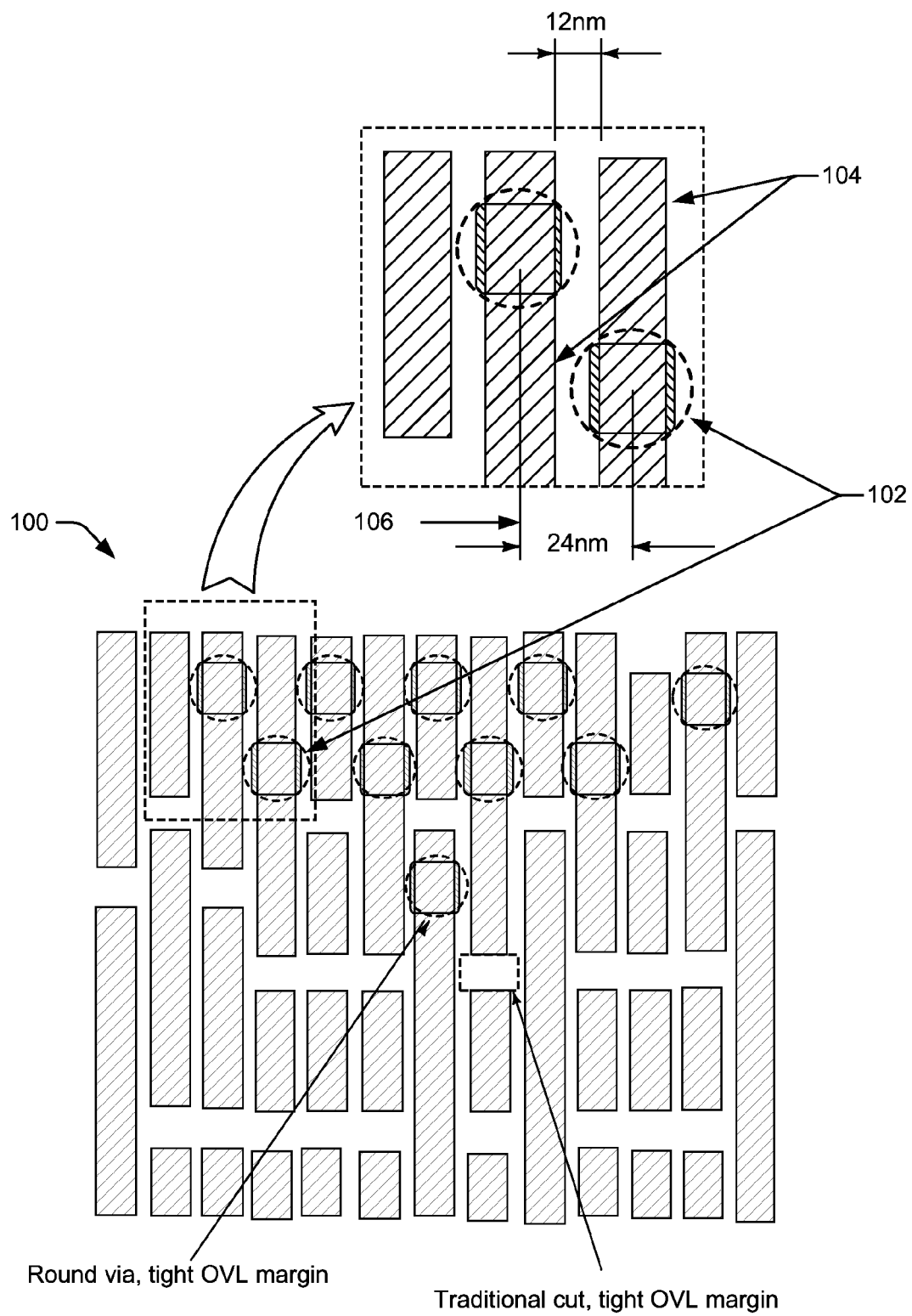
FIG. 1 illustrates an exemplary mask in which a via is created using a round, tight-margin opening.

Aspects disclosed herein include self-aligned metal cut and via for Back-End-Of-Line (BEOL) processes for semiconductor integrated circuit (IC) fabrication, and related processes and devices.

As noted above, conventional Back-End-Of-Line (BEOL) processing in scaled technology nodes requires tight overlay margins for metal cut and via placement. In contrast, the following processing techniques permit broad overlays at lower cost and higher reliability than conventional BEOL processing. Further, for very advanced nodes, conventional BEOL processing may not be usable.

The techniques described here, however, enable self-aligned metal cut and vias to be fabricated, thereby relaxing mask placement overlay requirements. This relaxation can be multiples of that allowed by conventional BEOL techniques. This is enabled through application of different fill materials for alternating lines in which a conductor will later be placed. With these different fill materials in place, a print cut and via mask is used, with the mask allowed to overlap other, adjacent fill lines to that of the desired line. Etching is then applied that is selective to the desired line but not adjacent lines.

In more detail, these techniques can be used with various fabrication techniques that permit higher pitch densities, such as Self-Aligned Doubled Patterning (SADP), Self-Aligned Quadruple Patterning (SAQP), and Lithography Etch Lithography Etch (LELE), as non-limiting examples.

LELE, for example, applies, using lithography, a set of material over another set, such as silicon nitride (SiN) over silicon dioxide ($SiO_2$). This LELE technique patterns one layer of resist into lines, and then etches into the next pattern (e.g., resulting in SiN lines). Then, this technique applies another layer of resist and pattern, and etches them into the layer (e.g., SiN), resulting in lines having a double pitch density.

SADP is a double patterning technique that patterns one set of lines (sometimes called a dummy or mandrel). Material is grown around the dummy lines. Then the material is etched anisotropically, leaving spacer lines. Another etch then removes the spacer lines and silicon below, resulting in silicon lines created (below the spacer lines) with a double density. While SADP can, in some cases, be less expensive than LELE, LELE can permit two-dimensional patterning, while SADP generally cannot. Two-dimensional patterning permits alternating lines of the multi-patterning techniques to have different heights or widths (the length considered to be along the parallel). The techniques described herein, however, can be used with both LE-type and SA-type techniques.

This document now turns to an example of conventional cut and via overlay margins and those enabled using techniques for self-aligned metal cuts and vias. These examples are followed by an exemplary end result of the techniques, after which methods that enable self-aligned metal cuts and vias and exemplary illustrations of these operations are shown. The discussion concludes with an exemplary computing device by which the methods may be performed.

FIG. 1 illustrates an exemplary mask 100 in which a via is created using a round, tight-margin opening 102 (e.g., a hole or transparency in the mask 100). Note the dimensional requirement of this conventional mask 100, which is limited by dimensions between lines 104. For some nodes, a pitch 106 between the lines 104 is 24 nanometers (nm), and because of this pitch 106, the placement of the conventional mask 100 must overlay with an accuracy smaller than half of the pitch 106, which in this case is 12 nm. Current photolithography cannot, with commercial feasibility, place a mask opening with an accuracy of better than about 6 nm. Add to this the accuracy limit of current photolithography scanners (e.g., those operating at 193 nm with immersion, 193i), which is about 9 nm. Thus, due to the opening 102 being within 6 nm of a desired placement and the scanner accuracy being 9 nm, conventional techniques require 15 nm of overlay margin to create desired structures. With a 24 nm pitch, however, the overlay margin is 12 nm. Thus, current techniques cannot reliably create desired structures, such as interconnects and vias, as the overlay margins are insufficient at these advanced nodes.

Figure 2:
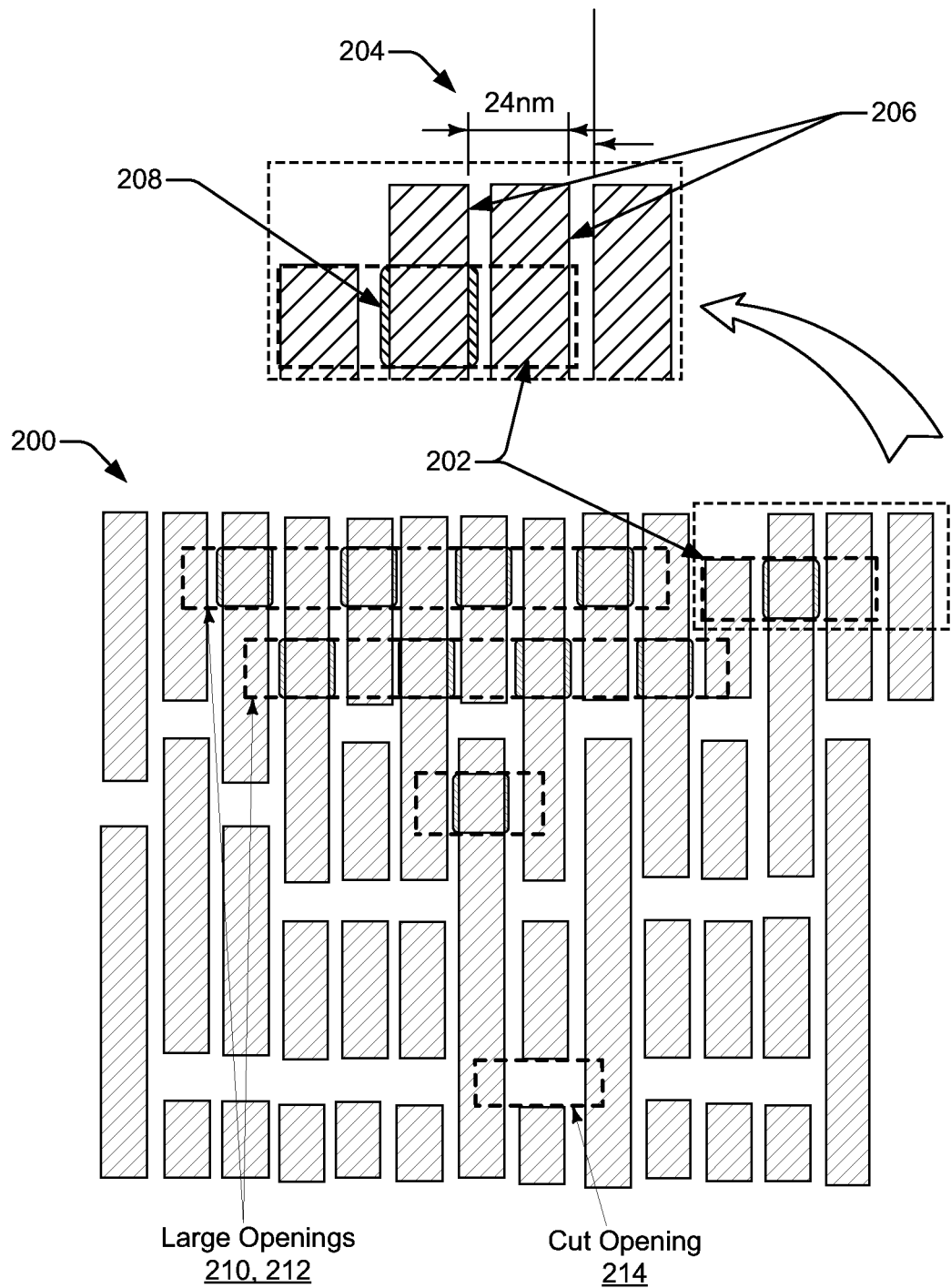
FIG. 2 illustrates an exemplary self-aligned mask, which is enabled by techniques enabling self-aligned cuts and vias.

FIG. 2 which illustrates an exemplary self-aligned mask 200 for enabling a self-aligned metal cut and via for BEOL processes for semiconductor IC fabrication. The self-aligned mask 200 permits an overlay margin of as much or even more than a pitch 204—here 24 nm. This is better than the 15 nm permitted by conventional photolithography scanners and placement techniques.

In more detail, the self-aligned mask 200 includes an opening 202 having an overlay margin of 24 nm based on a pitch 204 of lines 206. Thus, the described techniques permit creation of a metallic interconnection layer where the underlying structures have a pitch 204 of 24 nm or even less. A pitch 204 of even 10 nm to 15 nm can be permitted with the overlay margins permitted by the techniques for self-aligned metal cuts and vias based on current photolithography and scanner performance (e.g., light and non-light scanners or trackers), though this can be further improved as this 15 nm accuracy also improves.

Note the size of the opening 202, which enables creation of a via at via location 208, as well as a highly relaxed overlay margin in the horizontal direction at large openings 210 and 212, which permit vias at alternating lines 206. A relaxed overlay margin is also shown for a cut opening 214.

Figure 3:
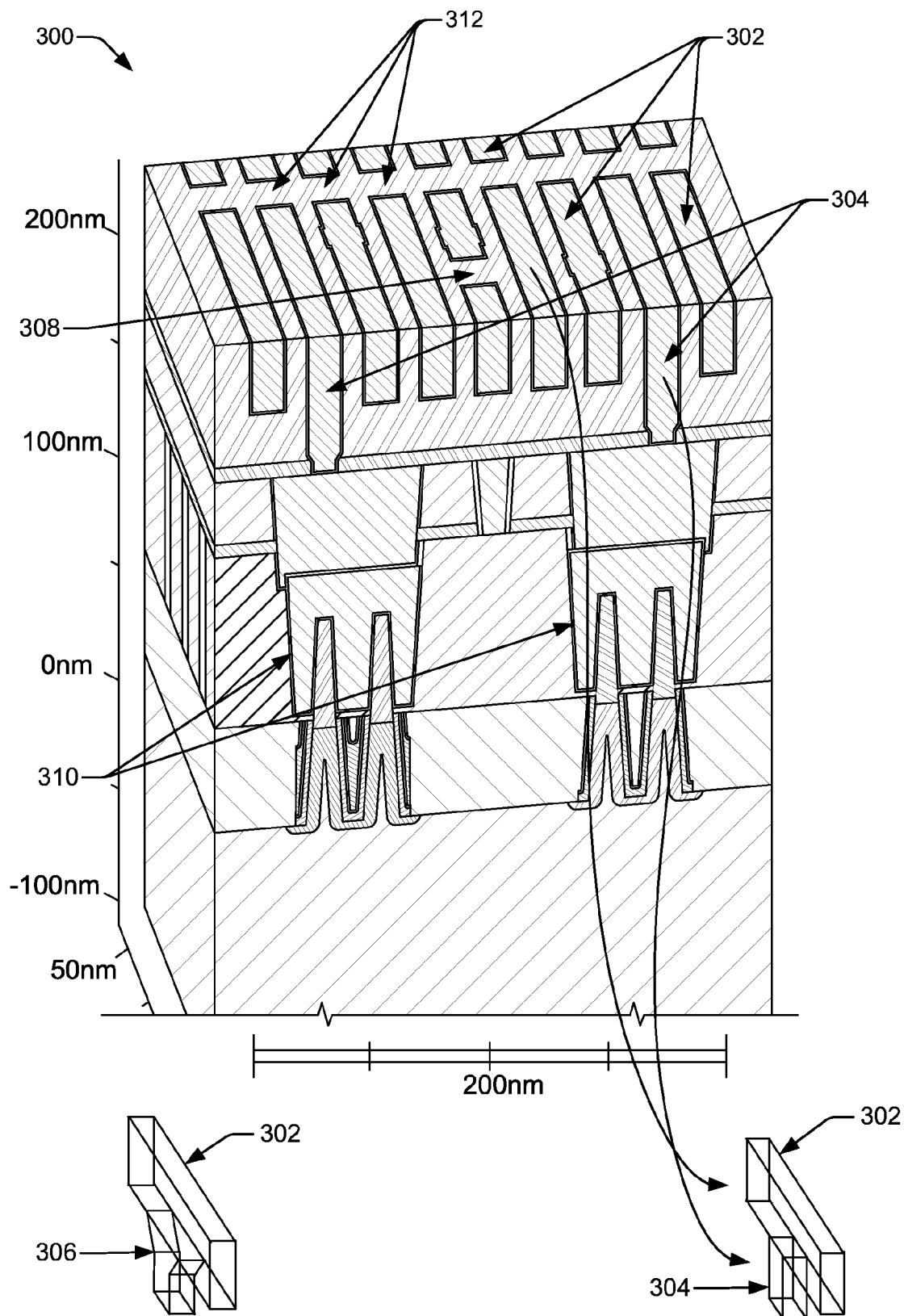
FIG. 3 illustrates one exemplary result of the techniques enabling self-aligned metal cuts and vias shown in FIG. 2, namely a semiconductor wafer, which includes metal lines and vias.

Prior to describing the methods, consider one result of the techniques for self-aligned metal cuts and vias, namely a semiconductor wafer 300 (portion shown) of FIG. 3, which includes metal lines 302 and metal vias 304. Voids for the metal vias 304 can be created at the same time as adjoining metal line 302 voids. These metal vias 304 do not have an irregular shape at a region bordering a metal line 302 void through which the metal via 304 void was etched during processing, again in contrast to vias created by some conventional techniques. These metal vias 304 can be superior to irregular vias because of different electrical properties of a smooth column or rectangular cuboid compared to an irregular or chamfered structure. Thus, in contrast to some conventional techniques in which via voids are created after creation of line voids, and thus etching of those via voids creates undesirable artifacts, the metal vias 304 of these novel techniques result in un-chamfered vias. As a visual comparison, consider a chamfered via 306 relative to the unchamfered structure of the metal via 304.

The semiconductor wafer 300 also illustrates a single line cut 308 enabled by the techniques. Note also components 310 to which each of the metal vias 304 permits electrical connection to other layers of the semiconductor wafer 300. A multiple line cut 312 is also illustrated, and can be fabricated through use of a large opening in a mask, such as the large openings 210 or 212 of FIG. 2.

Figure 4:
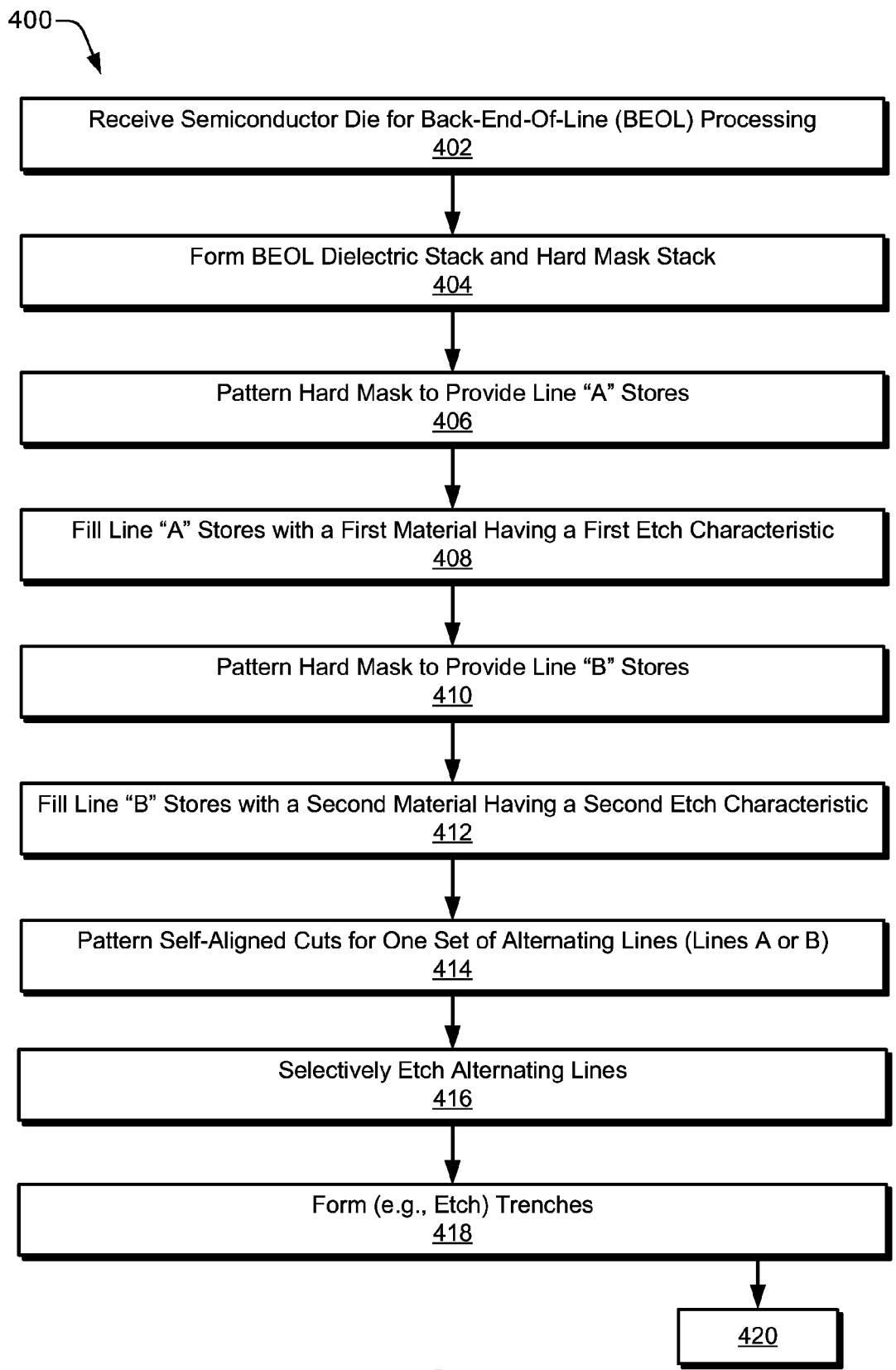
FIGS. 4 and 5 illustrate a method for fabricating self-aligned metal lines and vias.
Figure 5:
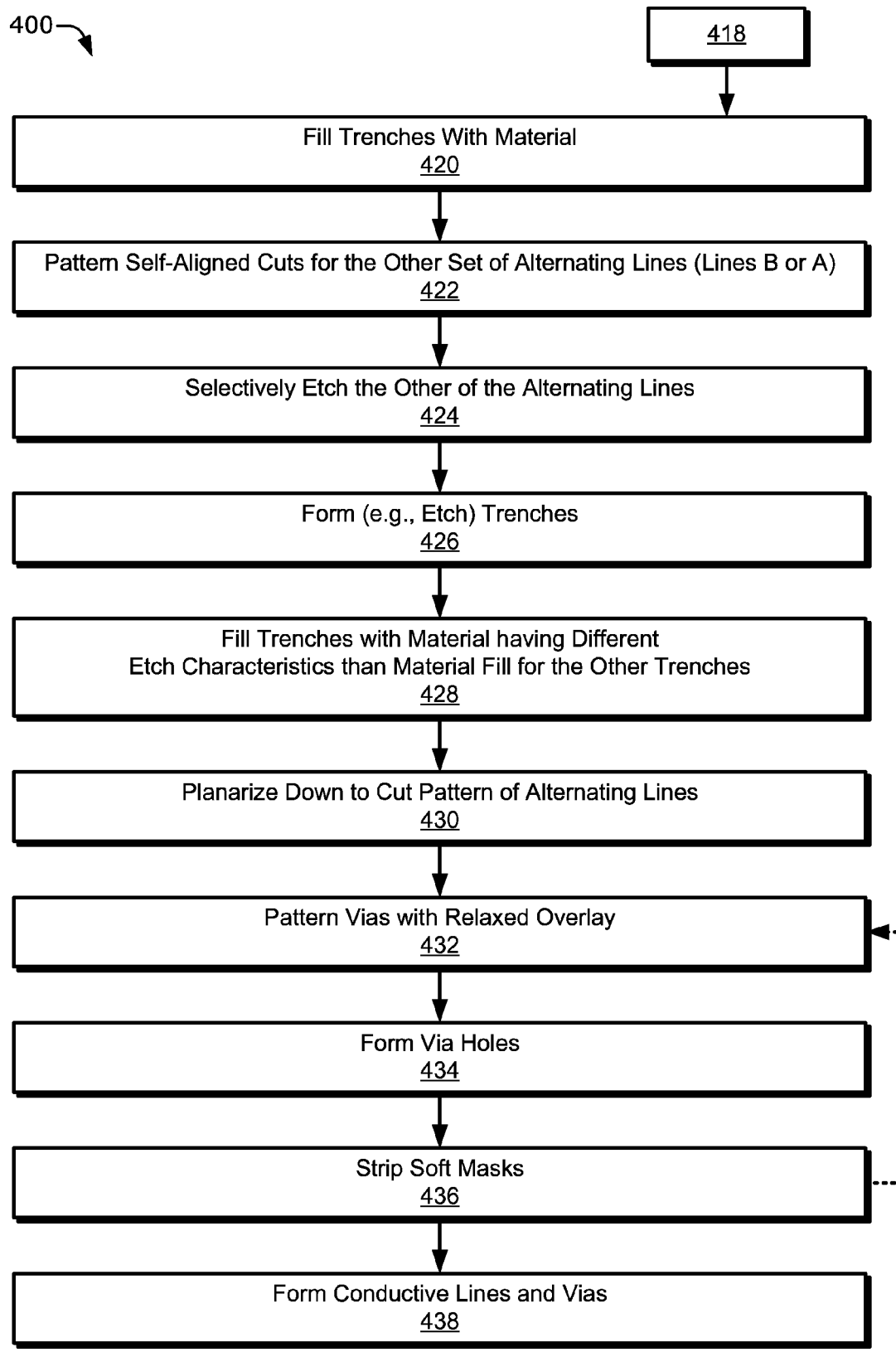

FIGS. 4 and 5 illustrate a method 400 for fabricating self-aligned metal lines and vias. The method 400 is shown as blocks that specify operations performed but are not necessarily limited to the order or combination. In portions of the following discussion reference may be made to FIGS. 1-3 and 6-24, which are intended as non-limiting examples only.

At block 402, a semiconductor die is received for BEOL processing. Generally, the semiconductor die has not yet received metal interconnections to the various components (e.g., transistors, resistors, and capacitors) to form an IC. At this stage, Front-End-Of-Line (FEOL) processing is often complete.

Figure 6:
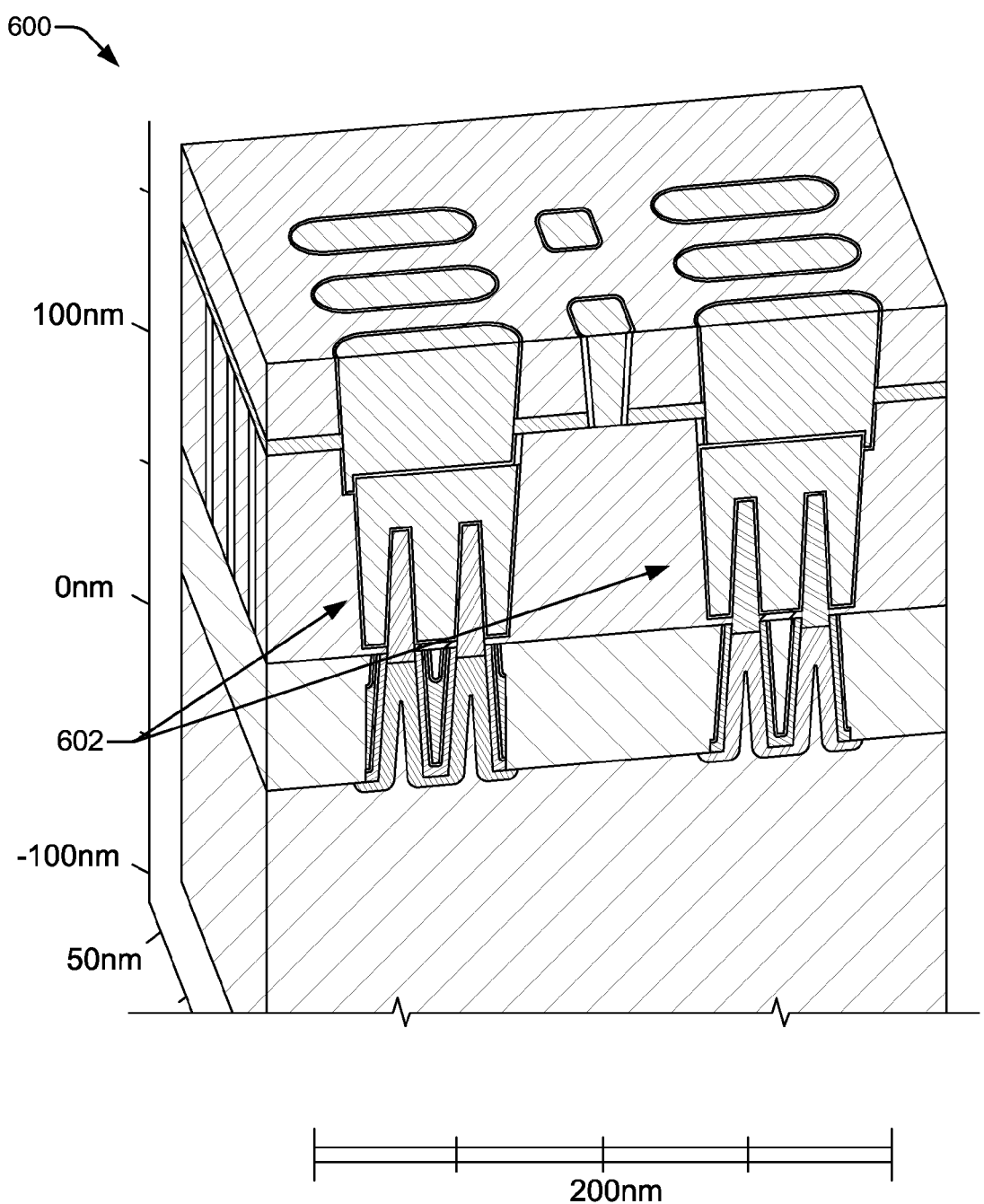
FIG. 6 illustrates an exemplary semiconductor die having various components.

An example of this semiconductor die is shown in FIG. 6, which illustrates a portion of a semiconductor die 600 having various components 602, some of which are seen in cross-section, to which metal lines and/or vias are needed for electrical connection. In FIG. 6, as well as numerous Figures that follow after, a scale is provided, which in these cases are in the nanometer (nm) range. This nanometer range represents an advanced processing node, though this particular processing node is not required for use of the techniques.

Figure 7:
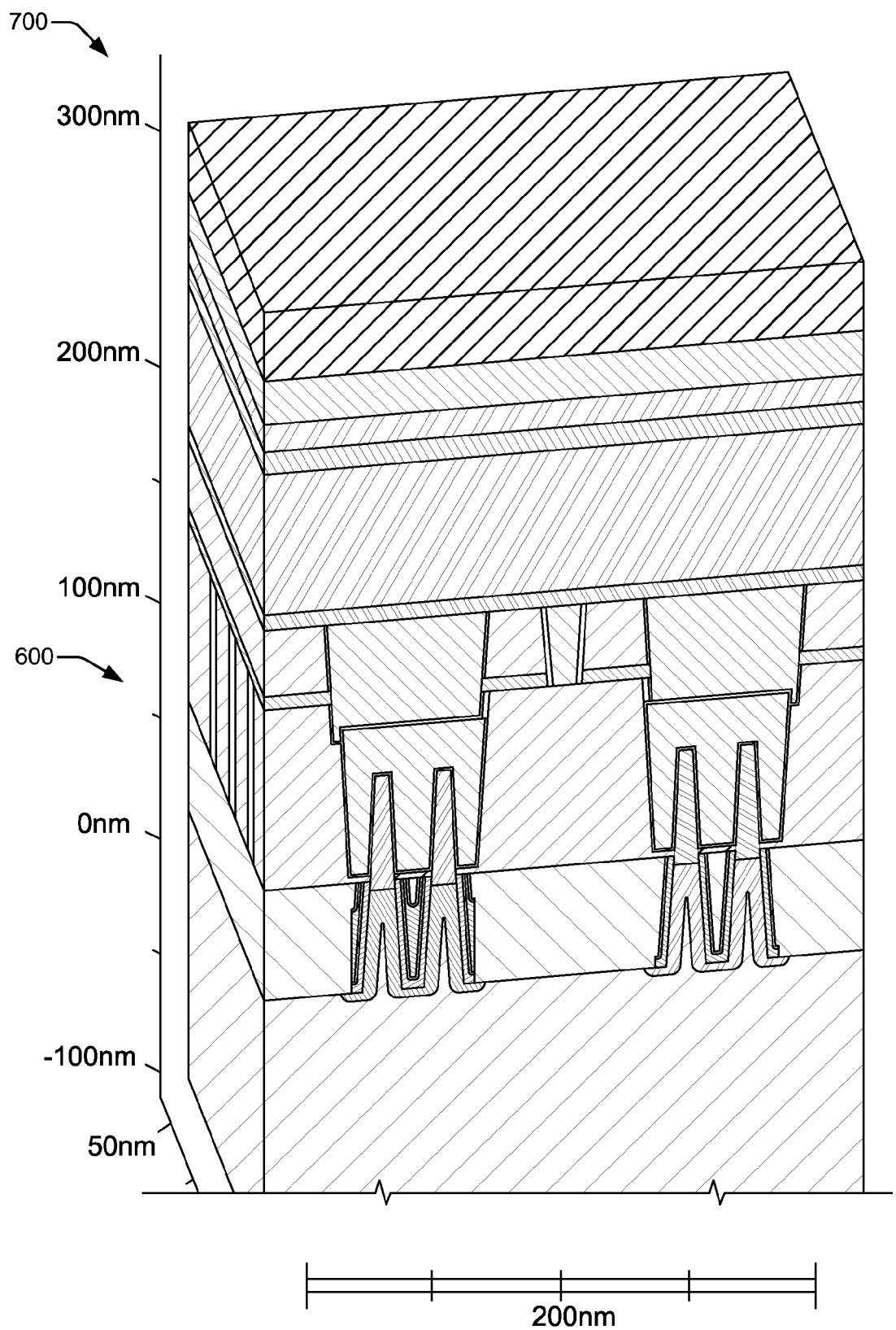
FIG. 7 illustrates the semiconductor die of FIG. 6 after addition of stacks for later processing.

At block 404, a BEOL dielectric stack and hard mask stack are formed. This hard mask stack can be of different types, depending on whether double or multiple patterning processes are being used. In this particular example, LELE (Litho, Etch, Litho, Etch) is used to form multi-pattern lines of material. As noted above, SADP and other processes can be used too. Note, however, that the techniques permit one or two dimensional multi-patterning techniques. Thus, one dimensional SADP and SAQP can be used, as can two-dimensional LELE processes. An example of this operation is shown in FIG. 7, which illustrates the semiconductor die 600 of FIG. 6 with stacks 700.

Figure 8:
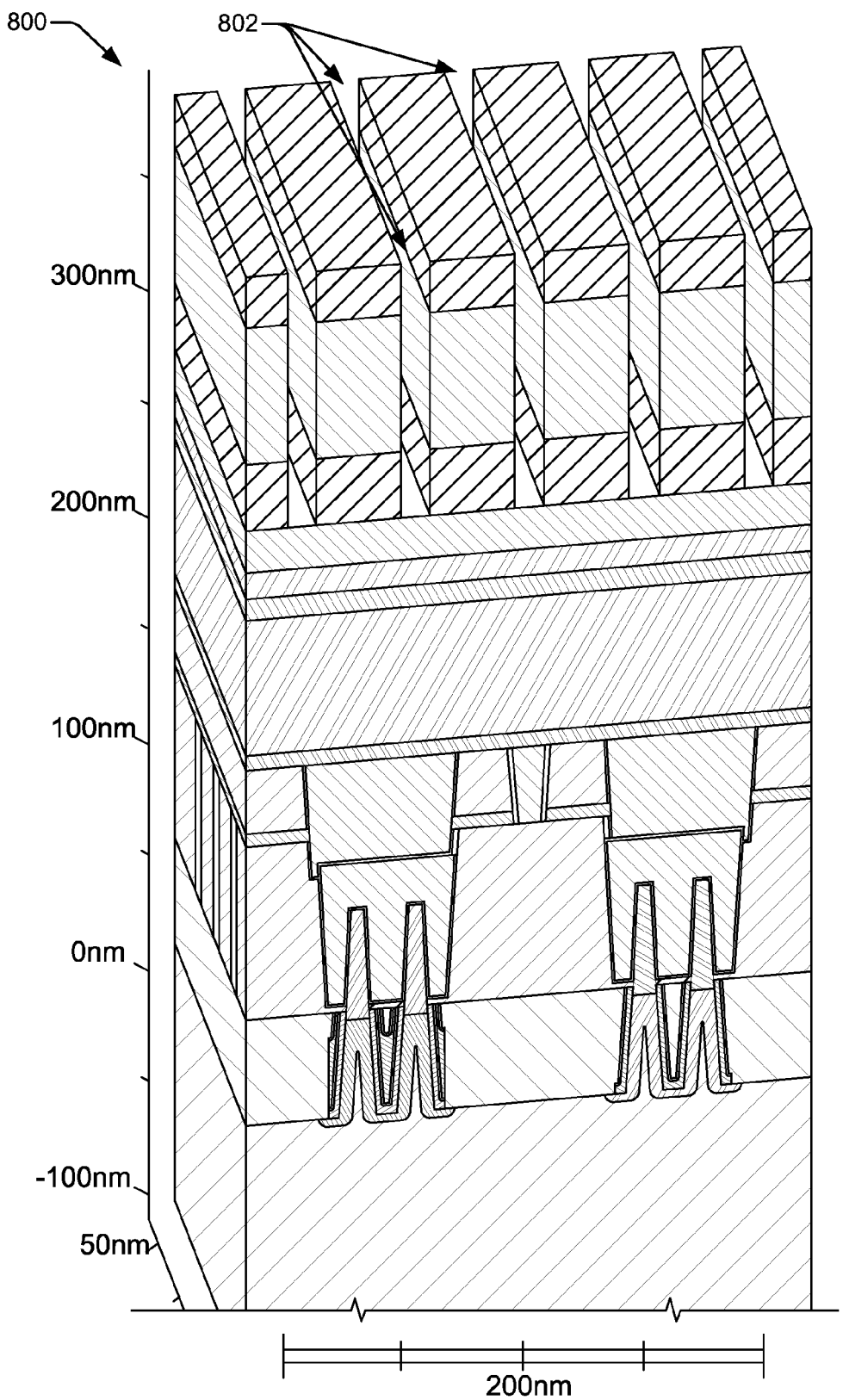
FIG. 8 illustrates the semiconductor die of FIG. 6 with a patterned hard mask of line stores.

At block 406, the hard mask is patterned to provide a line 'A' store. This is illustrated in FIG. 8, which shows a patterned hard mask die 800, with line 'A' stores 802 (e.g., voids for filling with material).

Figure 9:
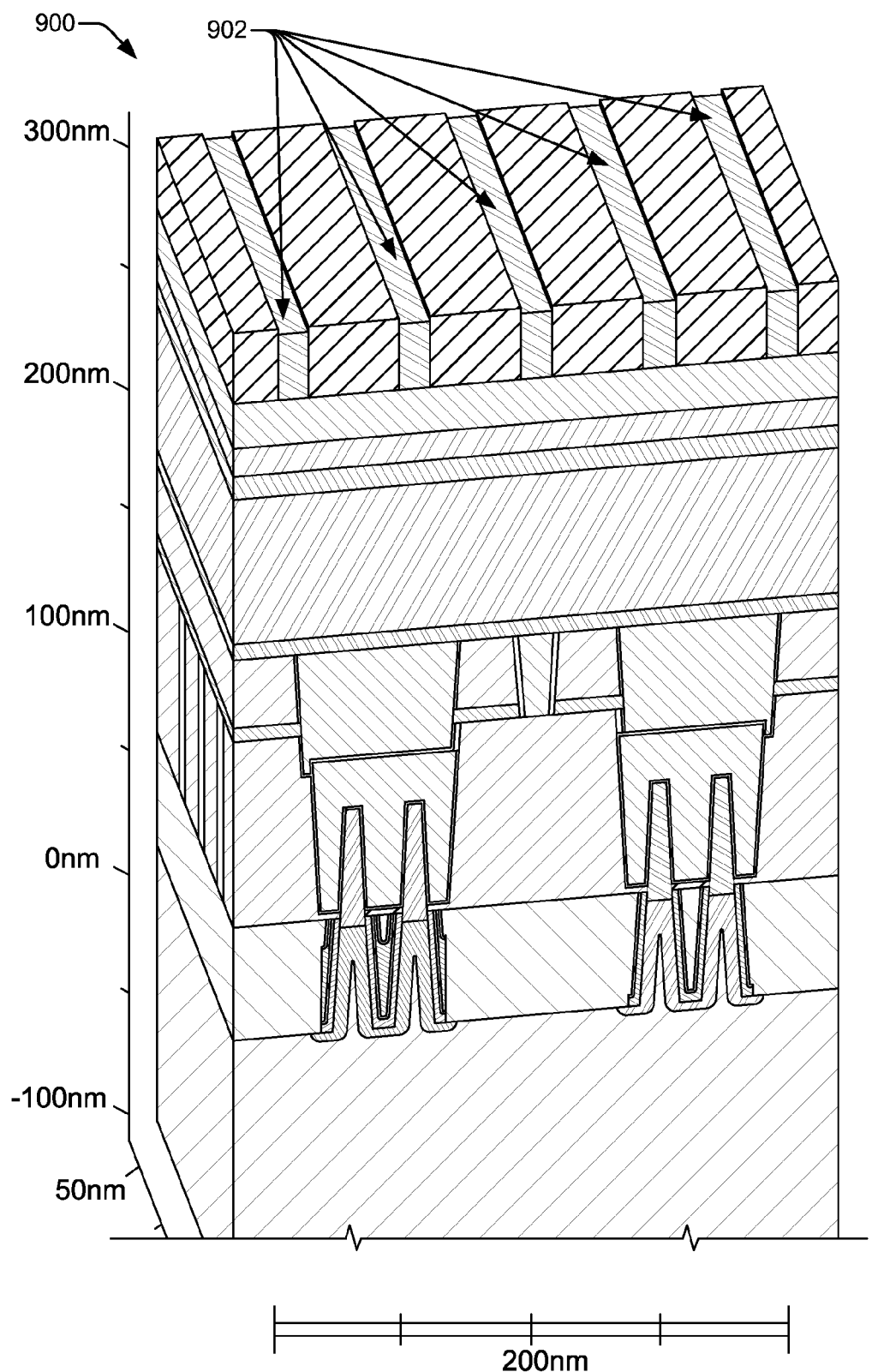
FIG. 9 illustrates the semiconductor die of FIG. 6 with the lines stores of FIG. 8 filled with a first material (lines A)

At block 408, the line 'A' stores are filled with a first material. The stripping of the lithography stack is also performed but not shown. This first material has particular etch characteristics that will be different than a second material forming lines 'B' described below. This is illustrated in FIG. 9, which shows a semiconductor die 900 having line 'A' filled with a first material, referred to as material A, and shown as lines A 902.

Figure 10:
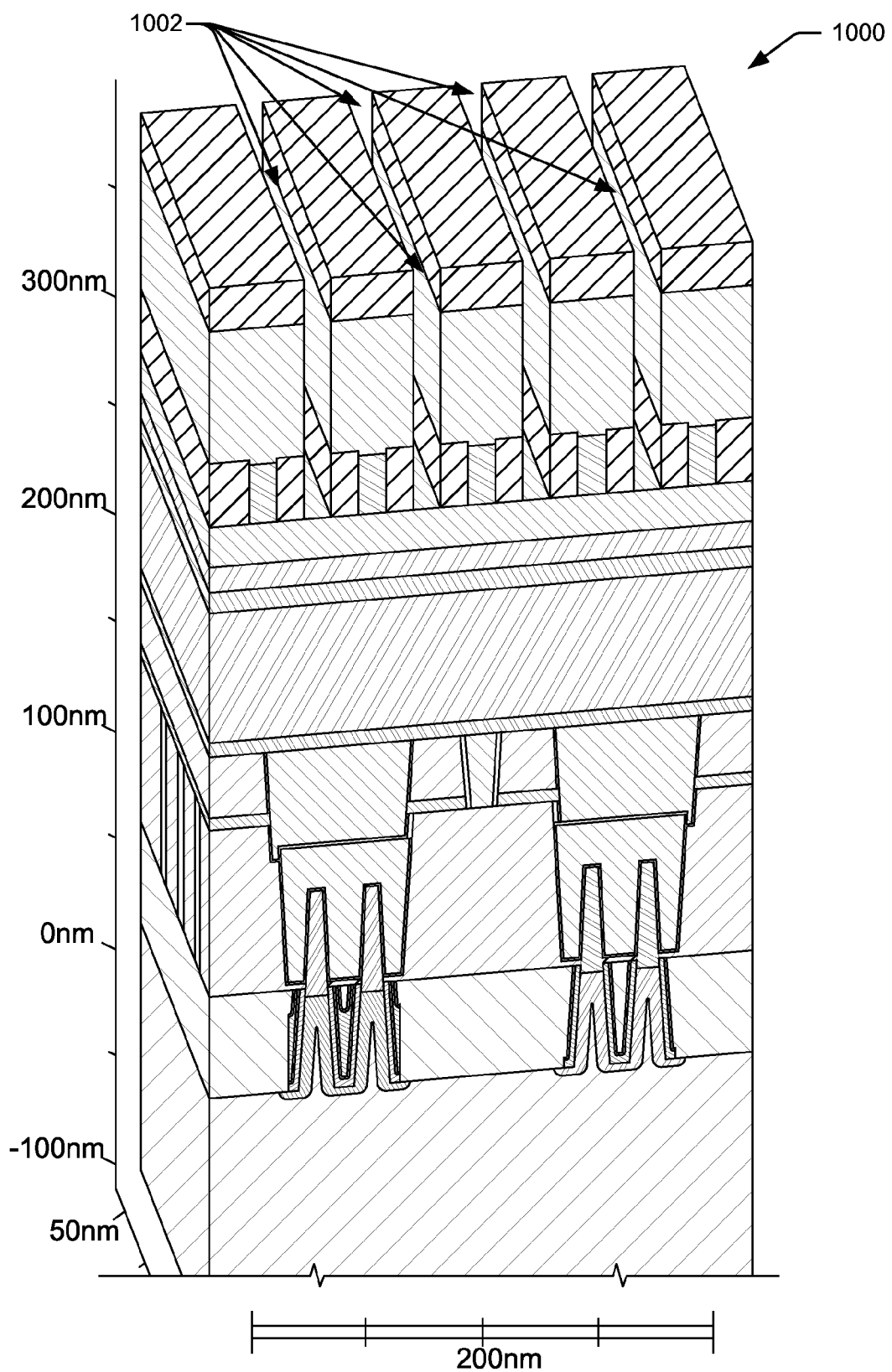
FIG. 10 illustrates the semiconductor die of FIG. 9 with a patterned hard mask of line stores.

At block 410, a hard mask is again patterned, in this case to provide line 'B' stores. This is illustrated in FIG. 10, which shows a patterned hard mask 1000, with line B stores 1002.

Figure 11:
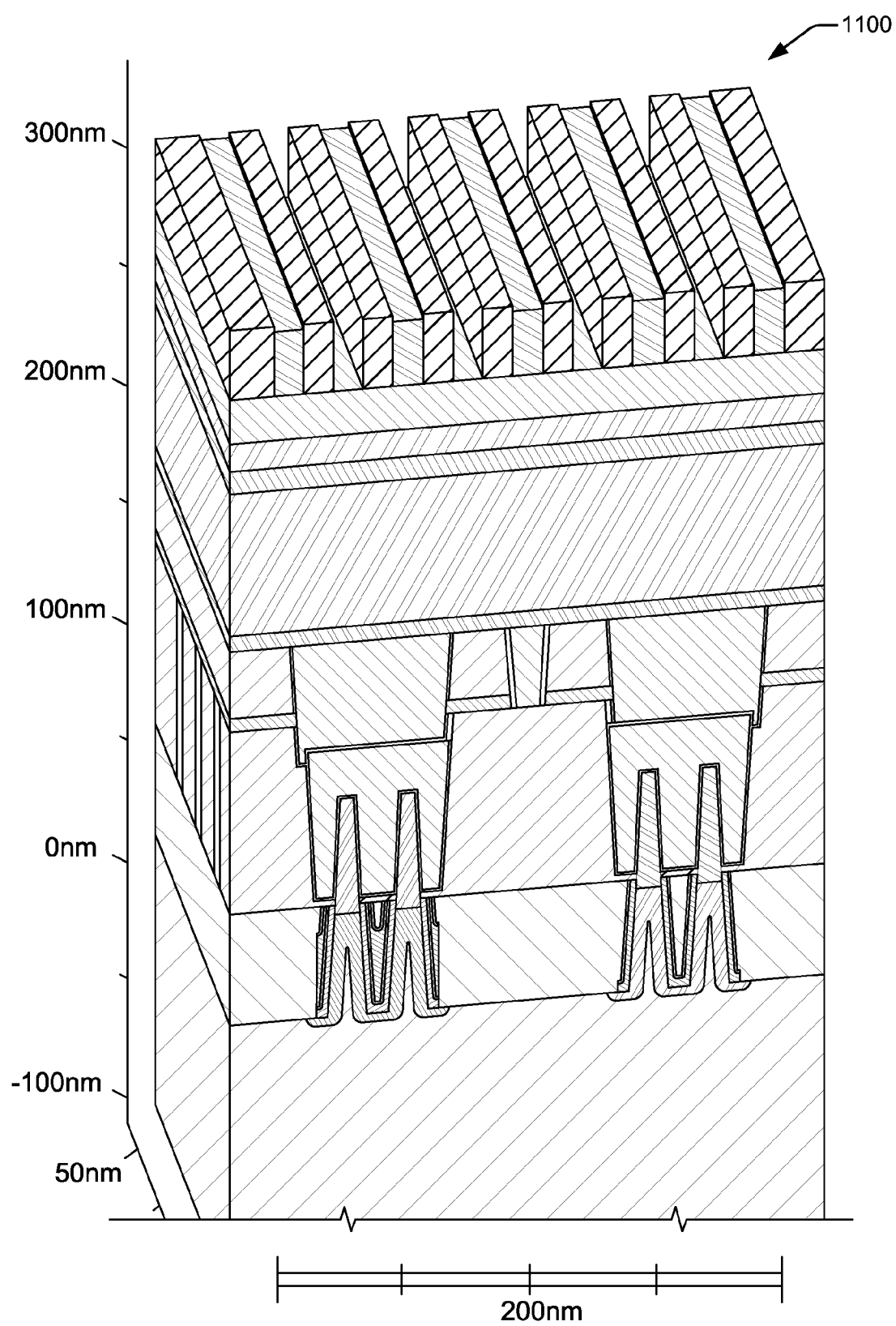
FIG. 11 illustrates the semiconductor die of FIG. 10 with a lithography stack stripped.
Figure 12:
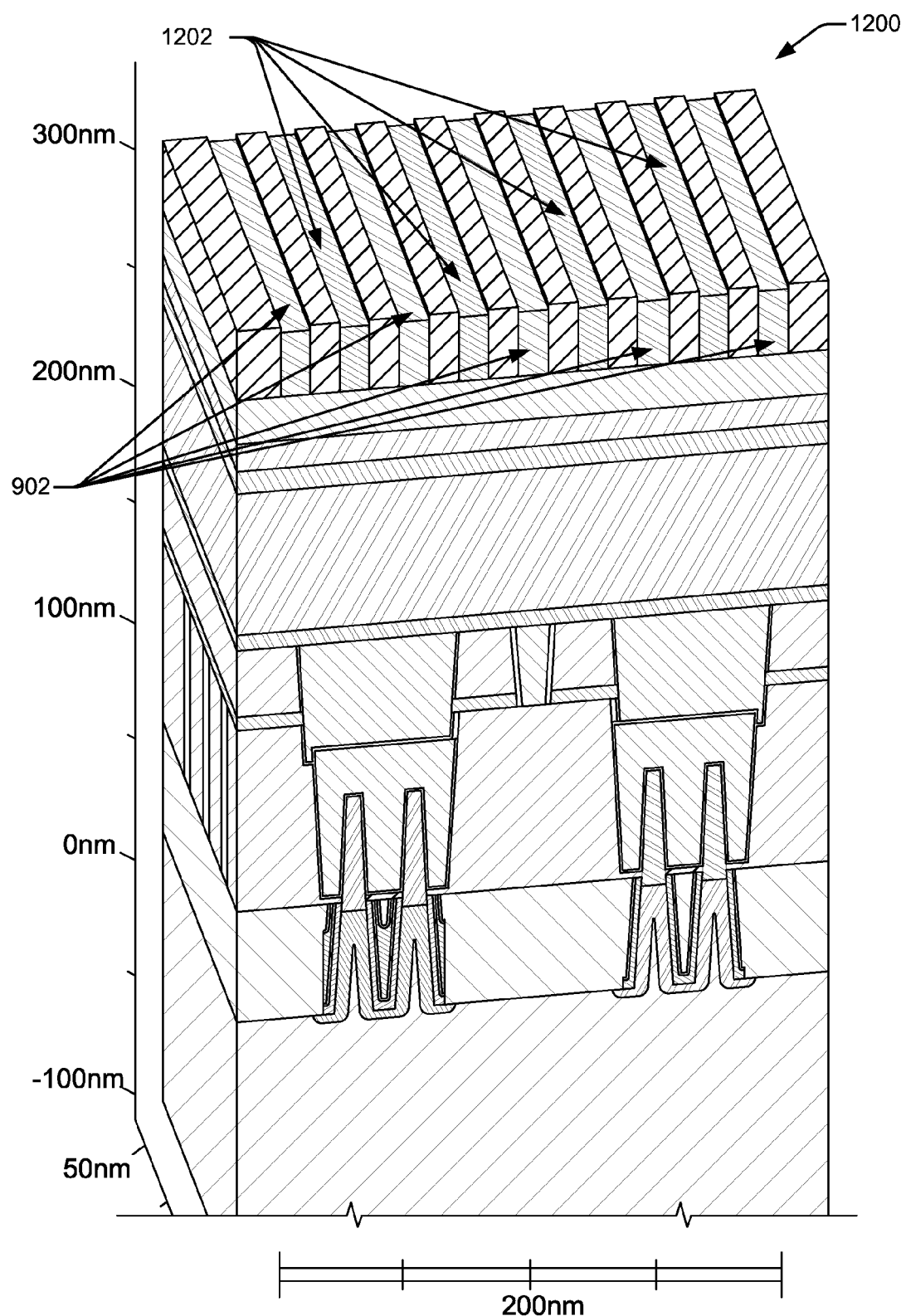
FIG. 12 illustrates the semiconductor die of FIG. 10 with the line stores filled with a second material (lines B), and which shows alternating lines A and B of different etch characteristic materials.

At block 412, the line 'B' stores are filled with a second material. The second material has etch characteristics that are different than the first material that formed lines 'A' noted above. The stripping of the lithography stack is shown in FIG. 11, with a stripped stack 1100. After the stripping, the line 'B' stores are filled with the second material. This is illustrated in FIG. 12, which shows alternating filled lines 1200 having lines 'B' 1202 filled with a second material, referred to as material B, and shown as lines B 1202. Note at this point in processing, that there are two sets of alternating lines (here parallel, though exactly parallel alignment is not required), with each of those sets having fill materials with different etch characteristics, here the lines A 902 in FIG. 9 and the lines B 1202 in FIG. 12.

Figure 13:
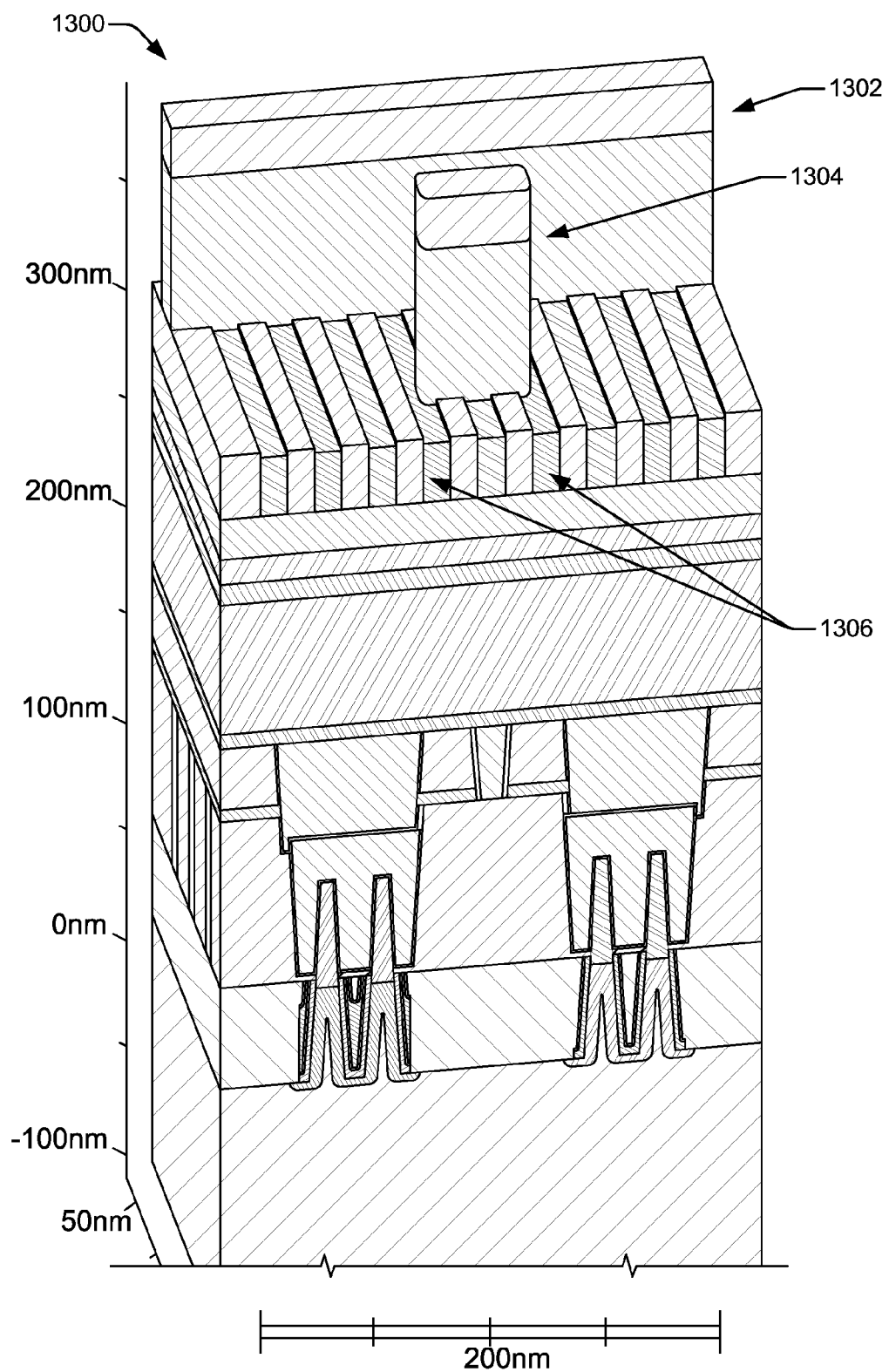
FIG. 13 illustrates the semiconductor die of FIG. 12 with a pattern having two mask layers and two structures.

At block 414, self-aligned cuts are patterned for one set of alternating lines. This set of alternating lines can be either lines 'A' or lines 'B' as noted above. This is illustrated in FIG. 13, which shows a pattern 1300 having two mask layers and two structures, a multi-line cut structure 1302 and a single-line cut structure 1304. The first structure protects, during future etching, alternating lines perpendicularly. This is referred to as a "cut" because it will later act to "cut" a conductive structure, though it protects the materials of the alternating lines. The protection of the materials of the alternating lines acts to prohibit the conductive structure from being formed at the cut. Note the overlap of the structures shown, such as the multi-line cut structure 1302 overlapping multiple neighboring, alternating lines, and the single-line cut structure 1304 overlapping two alternating lines 1306 of the lines B 1202 of FIG. 12.

Figure 14:
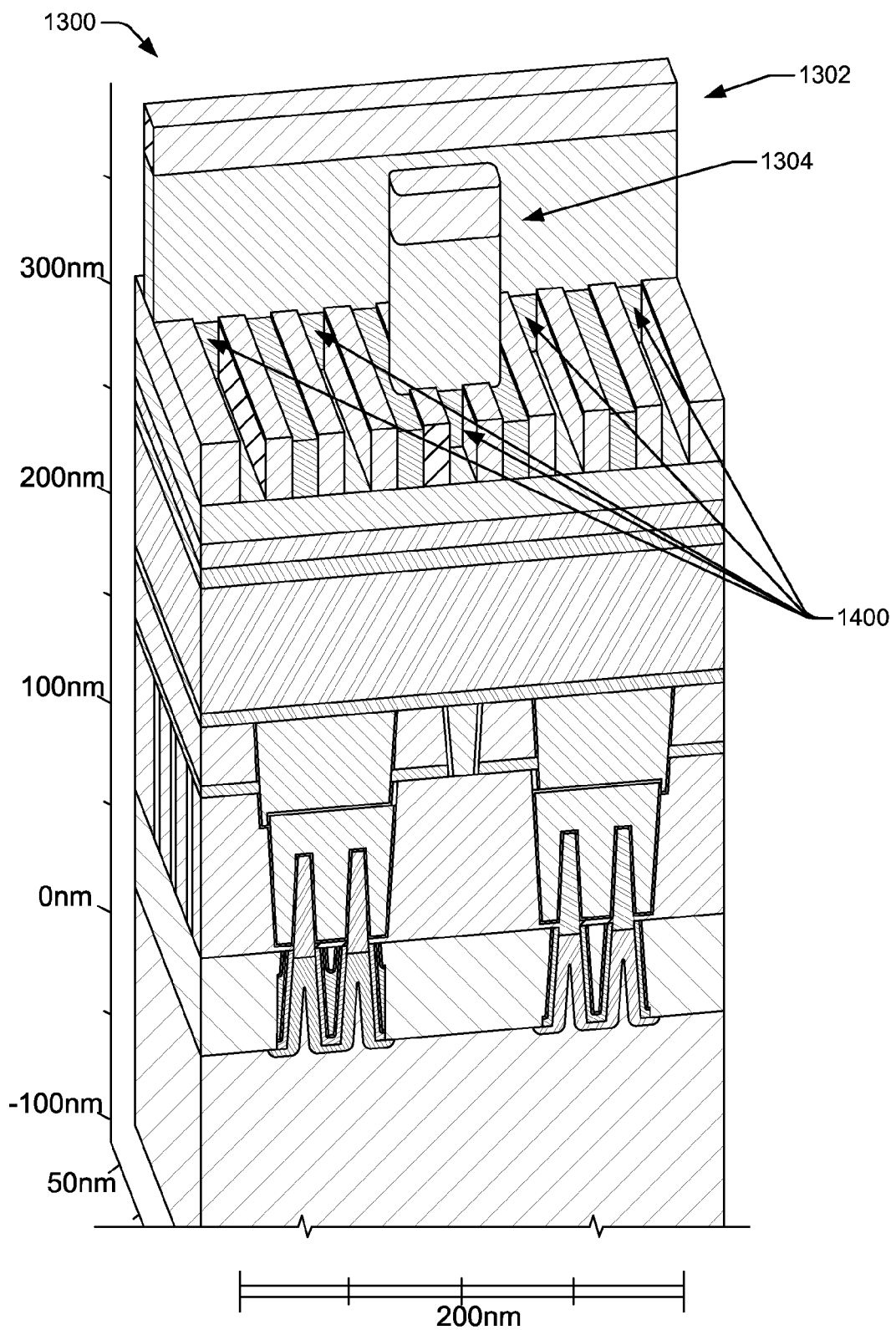
FIG. 14 illustrates the semiconductor die of FIG. 13 with material remaining at lines A of FIG. 9.

At block 416, a selective etching of the alternating lines of different fill materials is performed. This selective etching is effective to remove material from one of the two materials of the lines, in this particular case material A of the lines A 902 of FIG. 9. This is illustrated in FIG. 14, which shows the pattern 1300 and the multi-line cut structure 1302 and the single-line cut structure 1304 of FIG. 13, which protected the material A in the lines A 902. Note the remaining material in the lines A 902 is now shown as remaining material A 1400, which was protected from etching by the pattern 1300.

Figure 15:
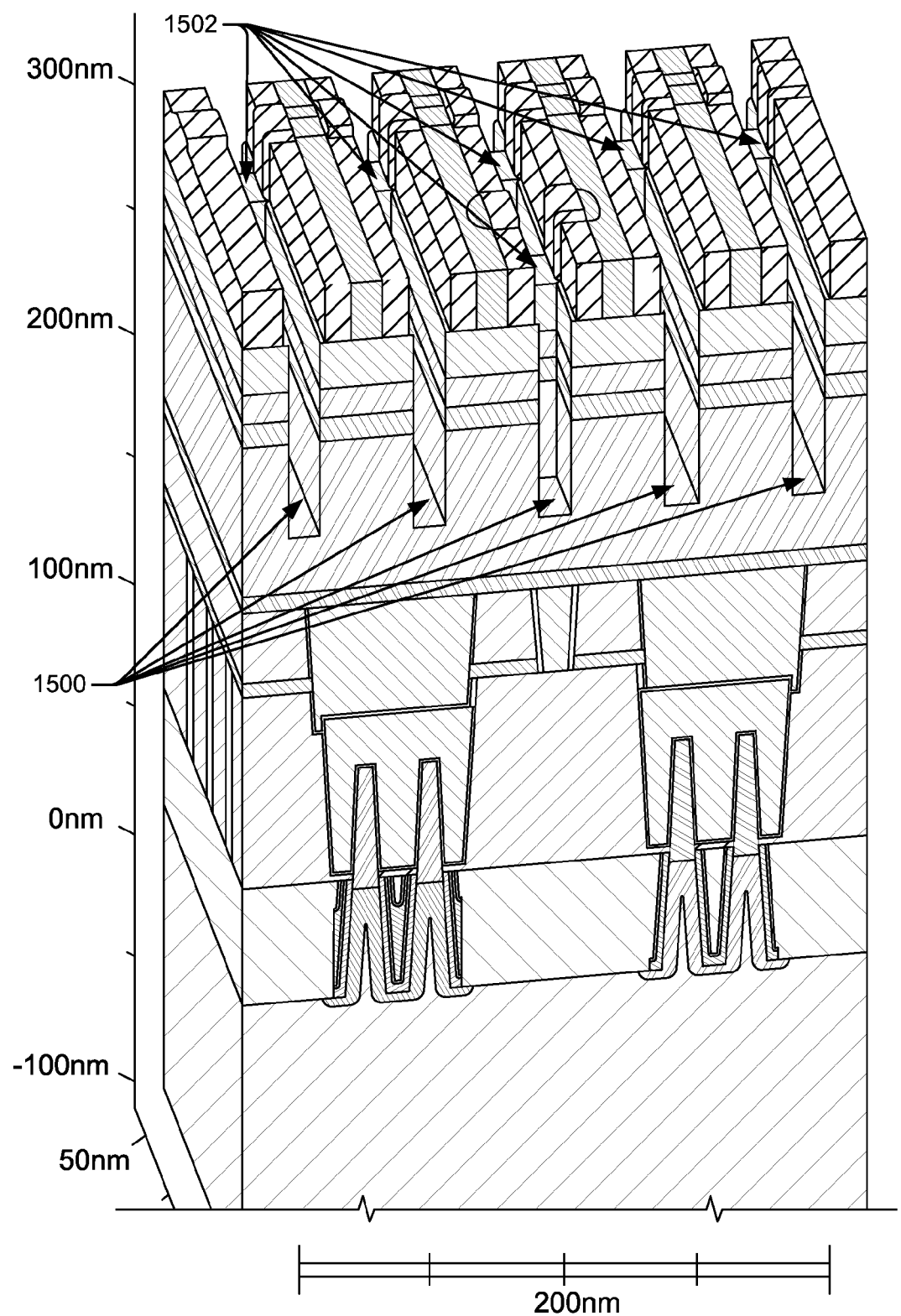
FIG. 15 illustrates the semiconductor die of FIG. 14 having line A trenches and cuts.

At block 418, trenches are formed (e.g., etched) to provide for later fill. These trenches etch through the lines A 902 and the pattern 1300, but leave the material for the line cuts from the pattern 1300 as noted above. This is illustrated at FIG. 15, wherein line A trenches 1500 and line A cuts 1502 are illustrated. While no material A remains, material from the line A cuts 1502 acts to prohibit conductive lines from being formed later in processing. This trench etching can be performed in various manners, such as low-K for a Titanium Nitride (TiN) hard mask (if used for the pattern 1300).

Figure 16:
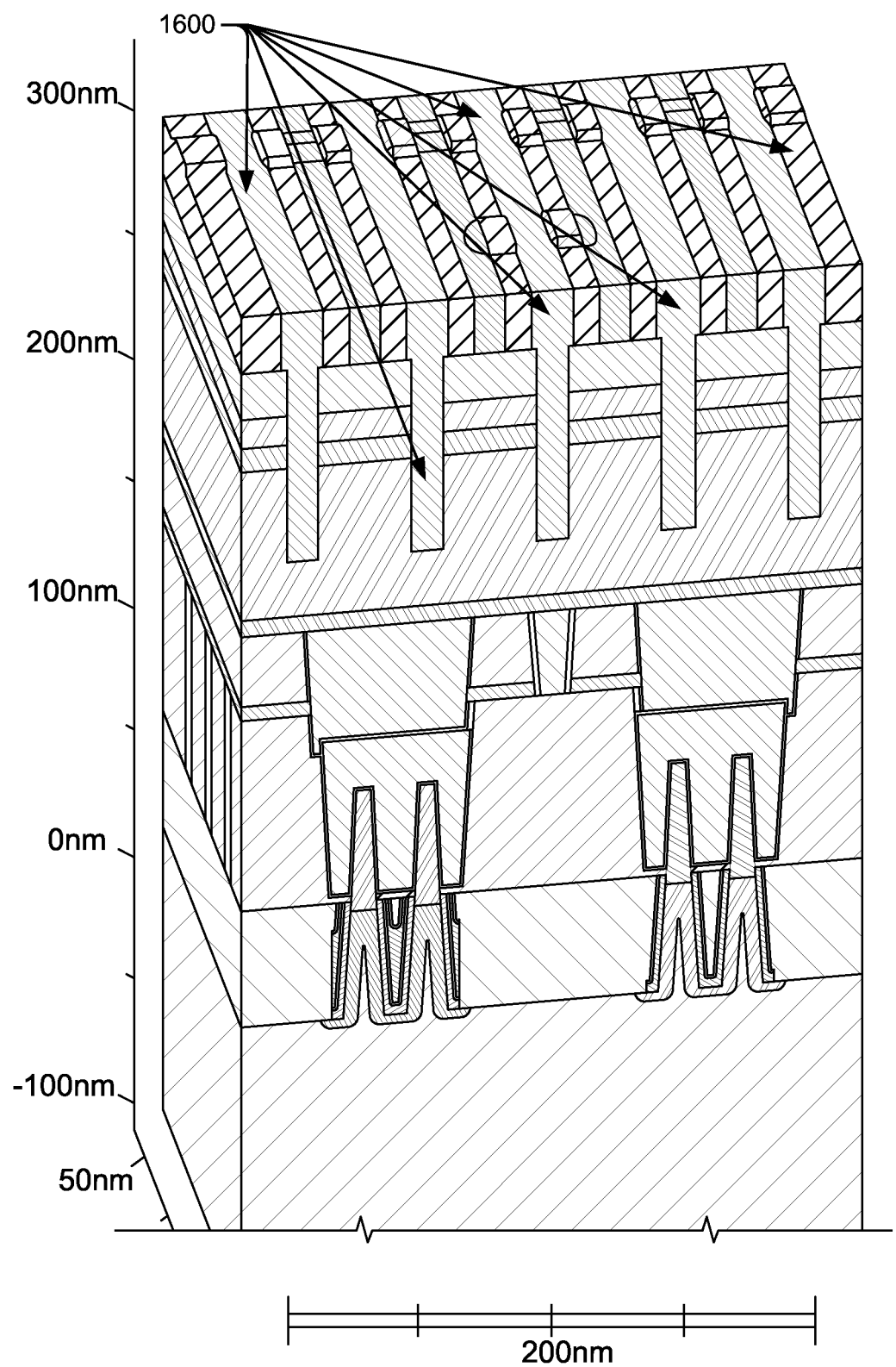
FIG. 16 illustrates the semiconductor die of FIG. 15 with the line A trenches filled with a gap fill.

At block 420, the trenches are filled, such as with a self-planarizing soft mask. This is but one of the many ways in which the trenches can be filled. This is illustrated at FIG. 16, which shows a gap fill 1600. Note that this soft mask material, for cases in which a via will later be formed, can have different etch characteristics than a material filling the other, alternating lines. The fill material may be identical to the material that was removed, in this case material A, though that is not required.

Figure 17:
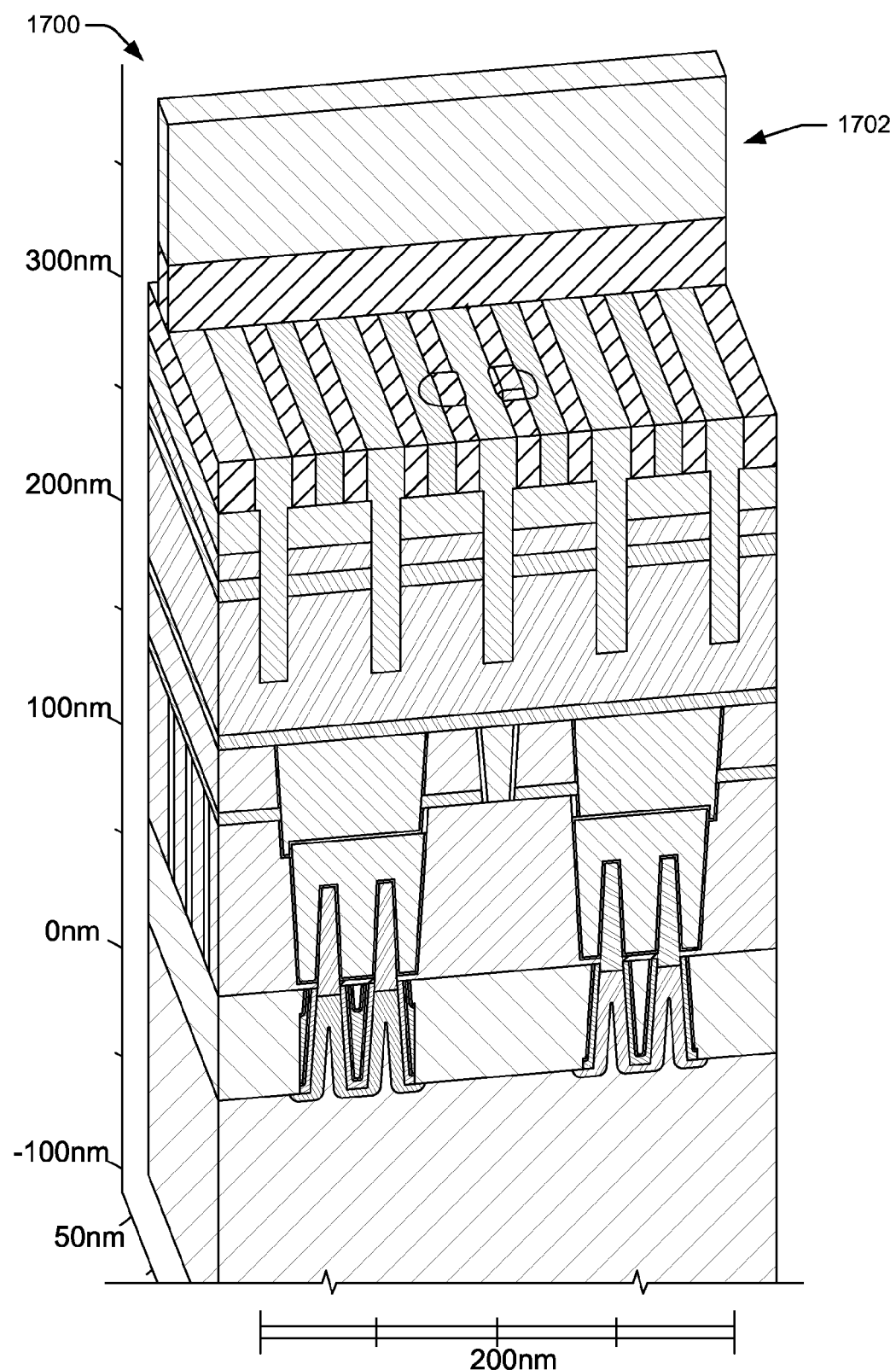
FIG. 17 illustrates the semiconductor die of FIG. 16 having a pattern with a multi-line cut structure.

At block 422, self-aligned cuts are patterned for the other set of alternating lines. This set of alternating lines can be either lines 'A' or lines 'B' as noted above. This is illustrated in FIG. 17, which shows a pattern 1700 having a mask layer and one structure, a multi-line cut structure 1702. The multi-line cut structure 1702 protects, during future etching, alternating lines perpendicularly. Here the techniques protect alternating lines, though they are now filled with material B.

At block 424, a selective etching of the other of the alternating lines of different fill materials is performed. Note that the alternating lines are now trenches filled with another material, which has different etch characteristics to that of the second set of lines, though it may or may not be identical to the previously applied material (material A of the first set of lines).

Figure 18:
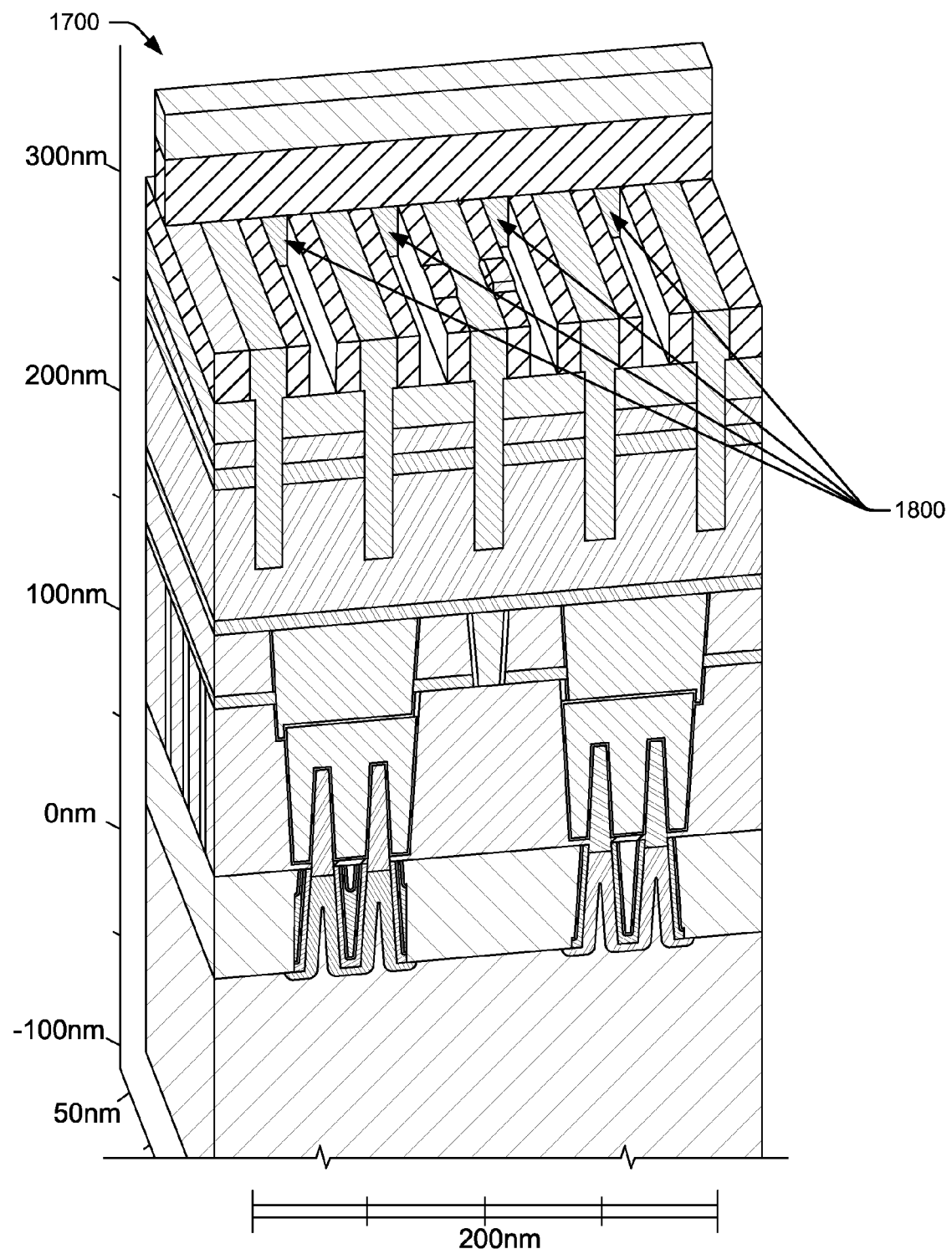
FIG. 18 illustrates the semiconductor die of FIG. 17 with material remaining at lines B of FIG. 12.

This selective etching is effective to remove material from the other of the two materials of the lines, in this particular case material B of the lines B 1202 of FIG. 12. This is illustrated in FIG. 18, which shows the pattern 1700 and the multi-line cut structure 1702 of FIG. 17, which protects the material B in the lines B 1202. Note the remaining material in the lines B 1202 is now shown as remaining material B 1800, which was protected from etching by the pattern 1700.

Figure 19:
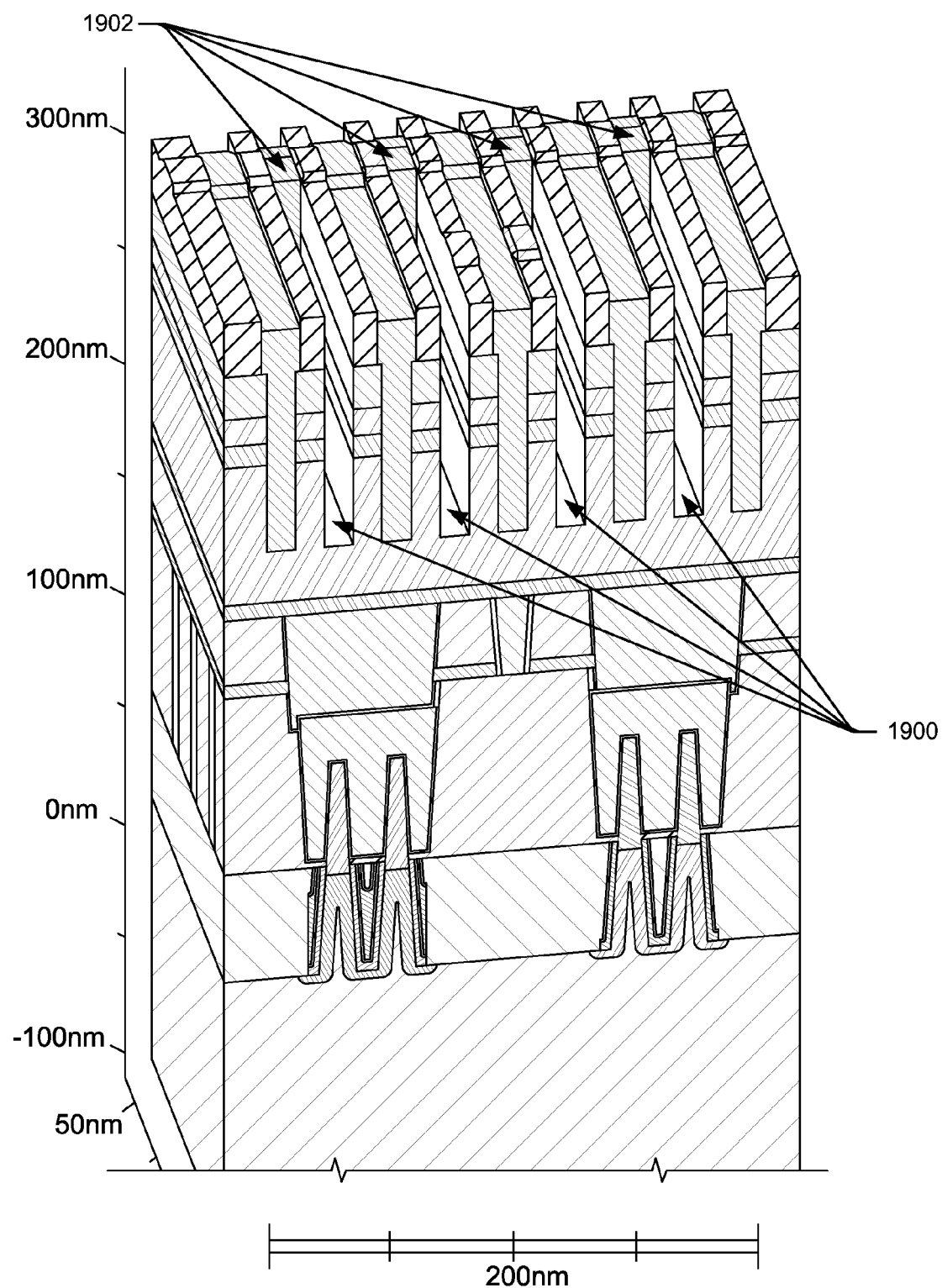
FIG. 19 illustrates the semiconductor die of FIG. 18 with line B trenches and cuts.

At block 426, trenches are formed (e.g., etched) to provide for later fill of conductive materials. These trenches etch through the lines B 1202 and the pattern 1700, but leave the material for the line cuts from the pattern 1700 as noted above. This is illustrated at FIG. 19, which shows line B trenches 1900 and line B cuts 1902. This trench etching can be performed in various manners, such as low-K for a TiN hard mask (if used for the pattern 1700).

Figure 20:
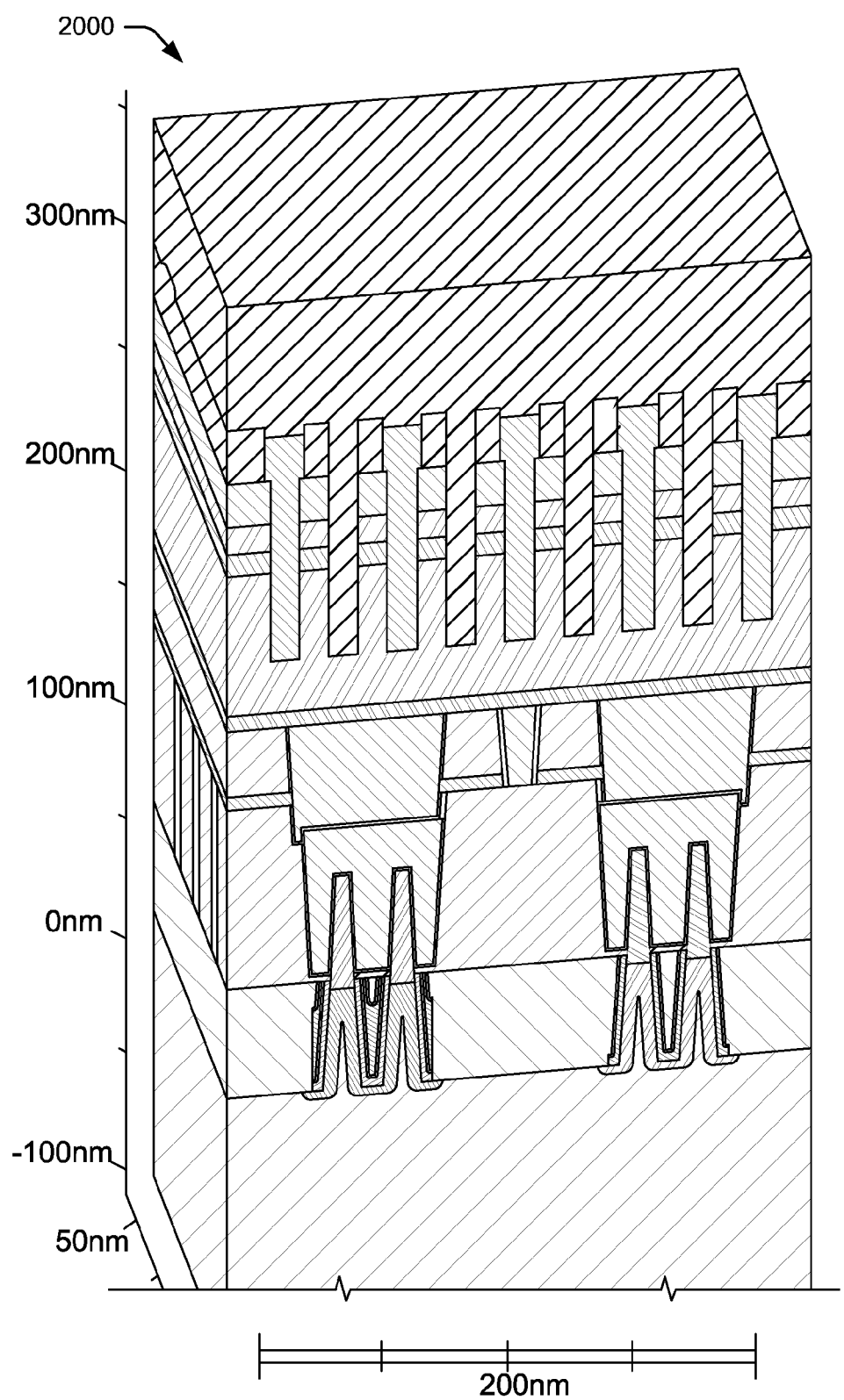
FIG. 20 illustrates the semiconductor die of FIG. 19 with line B trenches and cuts with a gap fill.

At block 428, the trenches are filled, such as those etched at block 426. The fill material can have different etch characteristics than the material filled at block 420, which can aid in permitting relaxed overlay margins for forming vias, which is described below. The fill material may be identical to the material that was removed from the alternating lines, in this case material B, though that is not required. Also, these trenches can be filled in various manners, such as with a self-planarizing soft mask. This is illustrated at FIG. 20, which shows a gap fill 2000.

Figure 21:
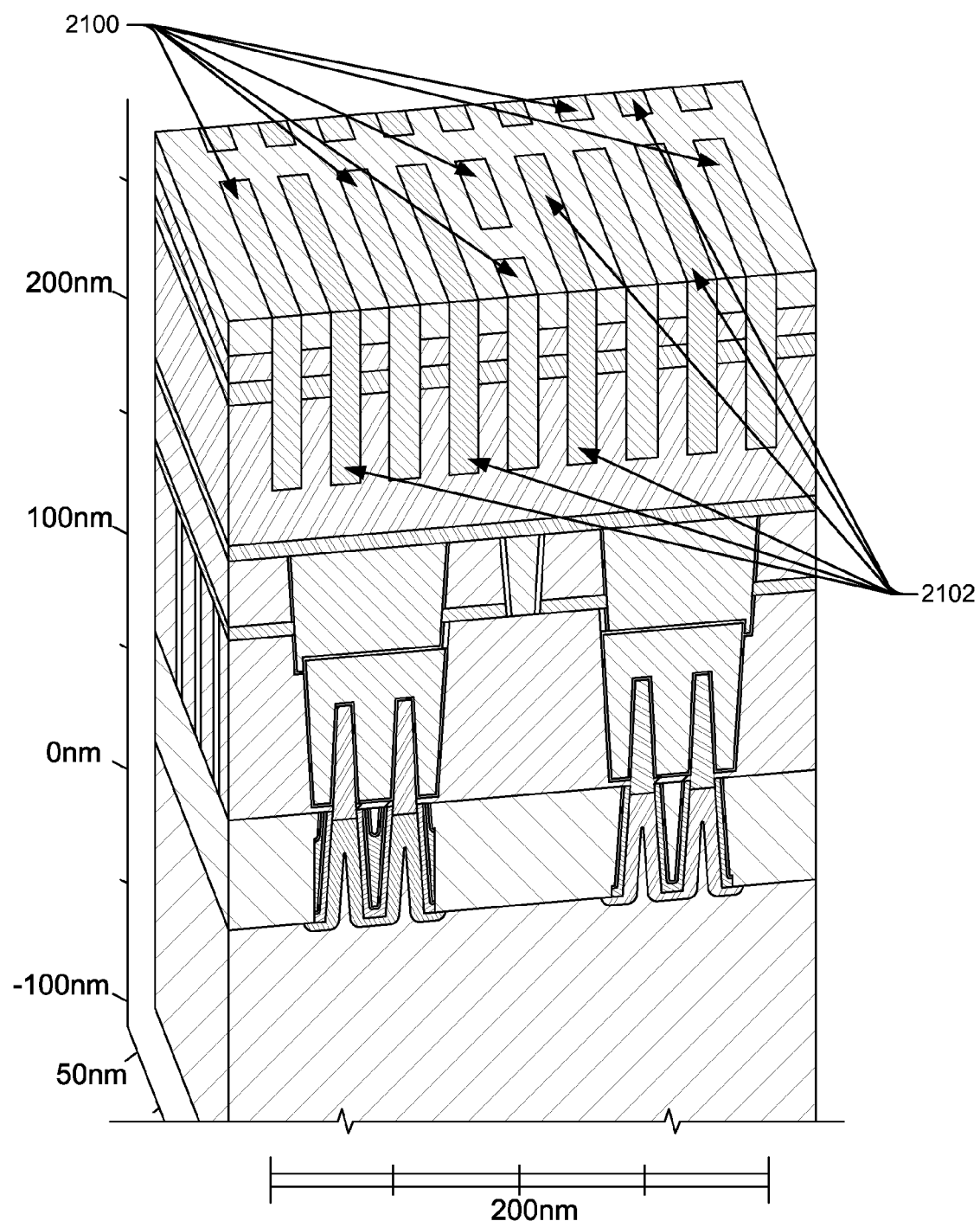
FIG. 21 illustrates the semiconductor die of FIG. 20 having alternating trenches, with the trenches alternating between materials of different etch characteristics.

At block 430, the soft mask (and other layers) are planarized to expose the cut pattern of alternating lines. After planarizing, these alternating lines have materials with different etch characteristics, though these materials may be different than, or the same as, materials A and B. This is illustrated in FIG. 21, which shows alternating trenches, with a material "one" filled trench 2100 and material "two" filled trench 2102. These trenches 2100 and 2102 are filled with materials having different etch rates, the trenches including the various cuts created as noted above. In some cases the material at a top layer, other than the fill materials, is a hard mask such as titanium nitride (TiN).

Figure 22:
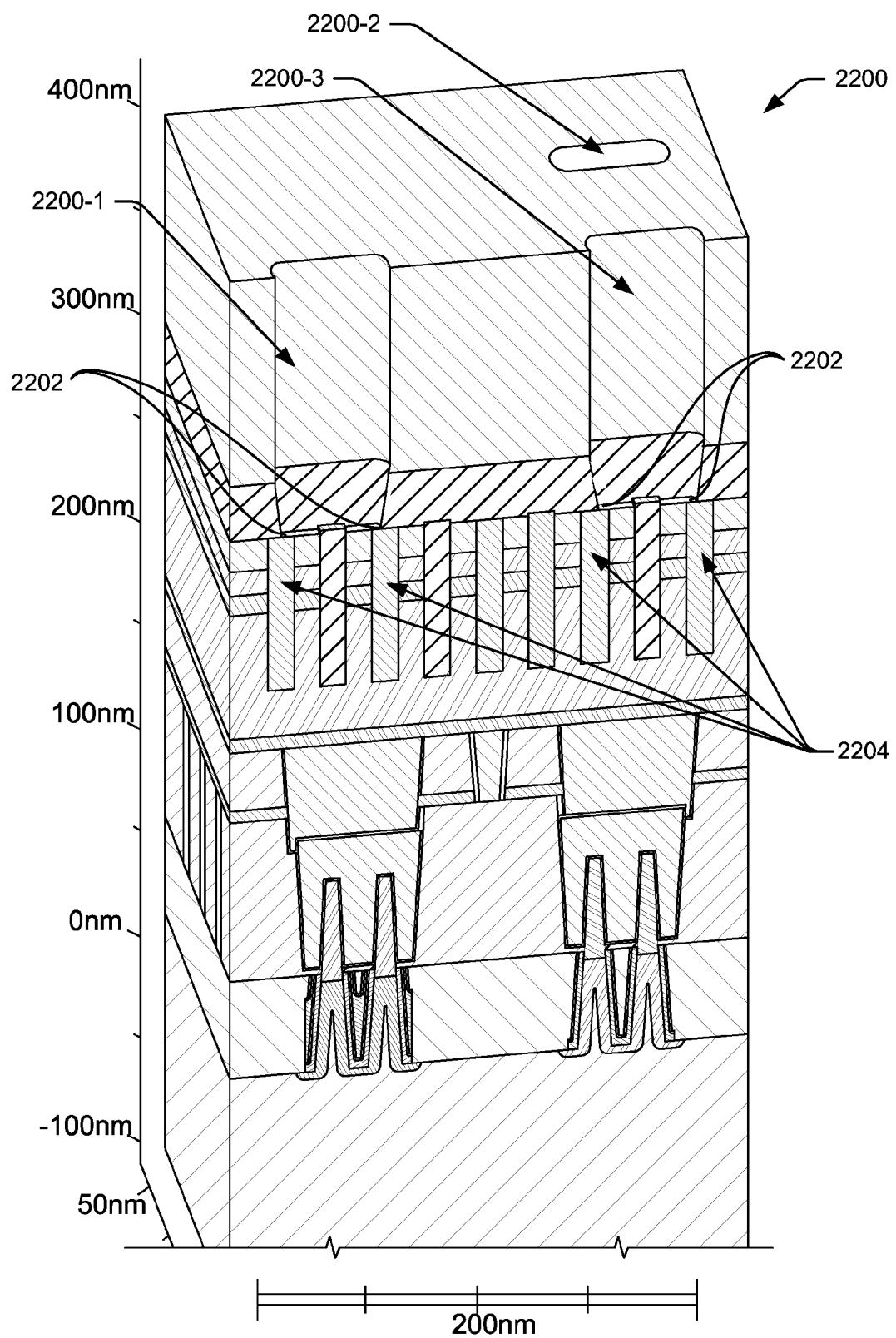
FIG. 22 illustrates the semiconductor die of FIG. 21 having a via pattern intending to generate vias, with each via pattern allowing an overlap with neighboring lines.

At block 432, vias are patterned with a relaxed overlay. This is illustrated in FIG. 22, which shows a via pattern 2200 intending to generate vias, with each of the via patterns 2200-1, 2200-2, and 2200-3 allowing an overlap 2202 with neighboring lines 2204. These neighboring lines 2204 are the filled trenches that alternate. The alternating trenches are filled with a material with different etch characteristics than the filled trench over which the via pattern 2200 is centered. The mask for the via pattern 2200 can be of various types, such as a soft mask material.

Figure 23:
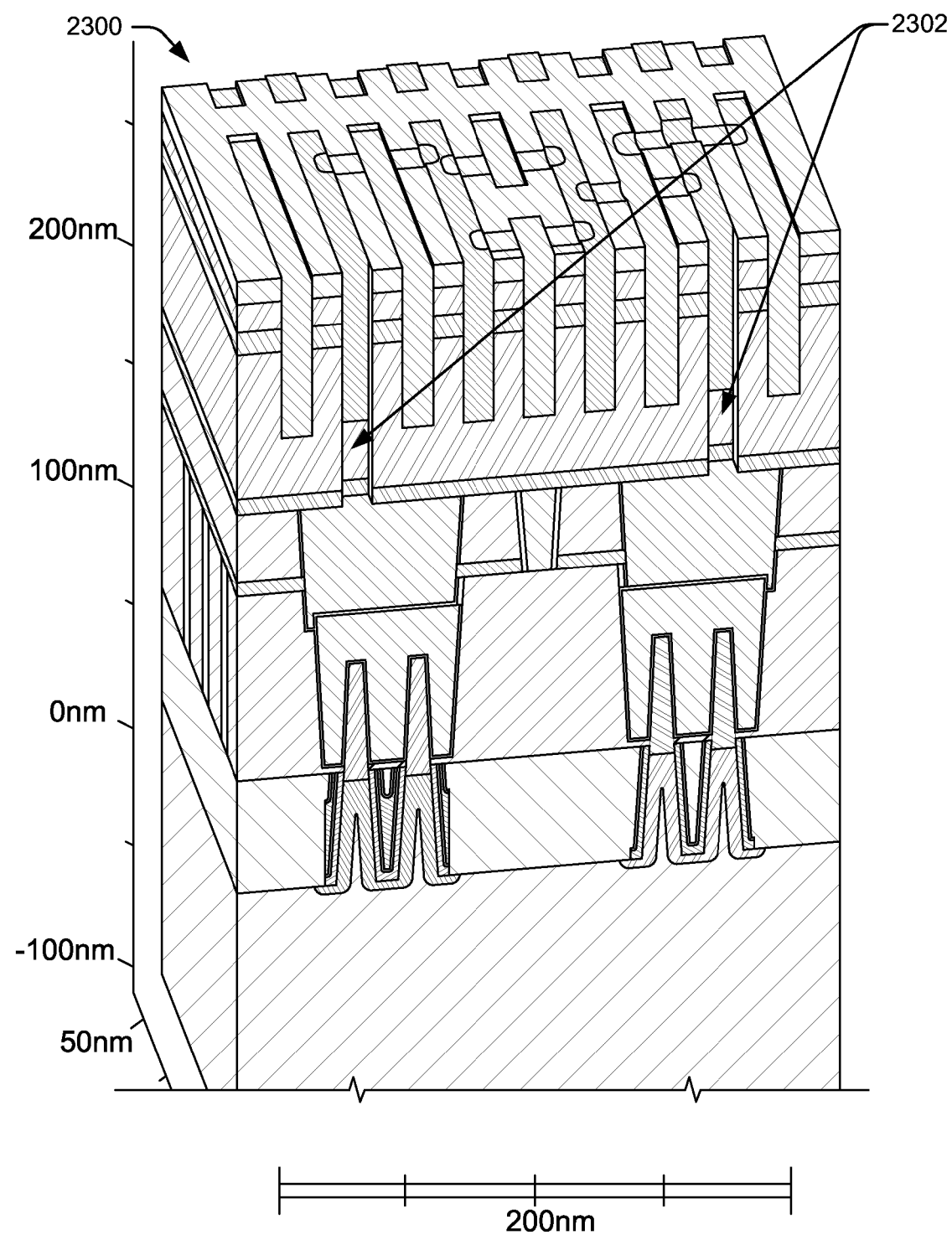
FIG. 23 illustrates the semiconductor die of FIG. 22 with via holes.

At block 434, via holes are formed. These can be formed through etching using an etchant that preferentially etches one of the materials of the alternating trenches more than another. In this case the via patterns 2200-1, 2200-2, and 2200-3 expose neighboring trenches to the etchant. Because these neighboring trenches are of a different material having different etch characteristics, these neighboring trenches are either not etched or are etched of an insignificant amount. The portion of the neighboring trenches exposed to the etchant are shown at the overlap 2202 in FIG. 22. This operation may involve planarization if some of the mask material remains after the via holes have been formed. This operation may also involve more than one etchant in cases where etching down to the components to which electrical connection is desired is performed through materials requiring a different etchant. The via holes are illustrated in FIG. 23, at via pattern 2300 and via holes 2302.

Figure 24:
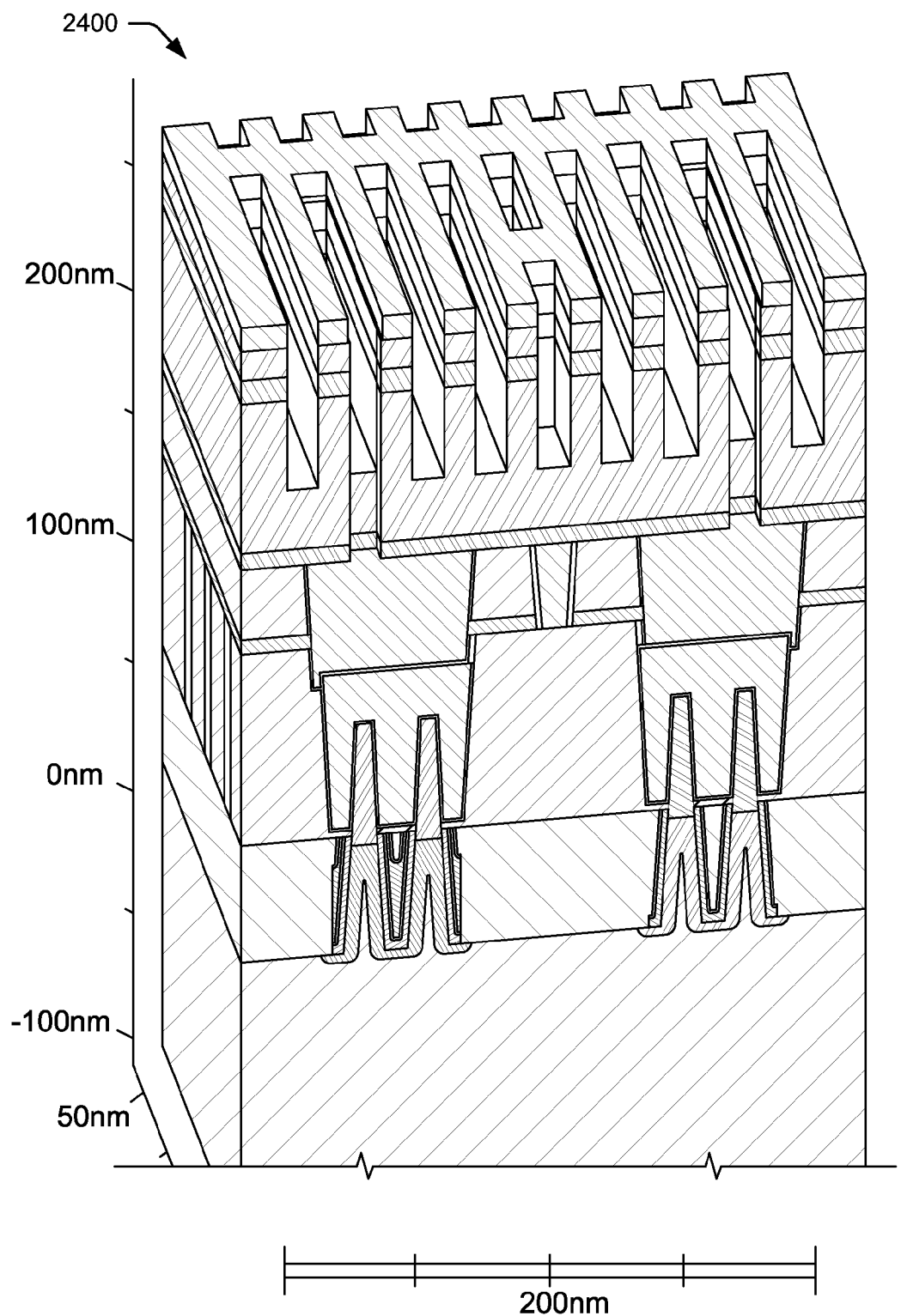
FIG. 24 illustrates the semiconductor die of FIG. 23 with a stripped pattern of cuts and vias ready for metallization, shown at FIG. 3.

At block 436, all soft masks are stripped. At this operation, or in additional operations not shown, additional via patterns can be formed. This alternative is shown with a dashed line from block 436 to block 432. Thus, one or more additional vias can be formed by repeating the operations at blocks 432 and 434, though with vias formed through the other trench material. As the operations at blocks 432 and 434 pattern and form via holes through the trenches, repeating the operations would form via holes through the trenches, and thus through the other trench material (shown in FIG. 21). The result of the soft masks being stripped is shown in FIG. 24 at stripped pattern 2400.

At block 438, conductive lines and vias are formed. This can be through copper metallization, for example, as is often the case for dual-Damascene and Damascene processing. While not shown, after the conductive lines and vias are formed, the undesired layers may be removed through planarization. The results are illustrated in FIG. 3 and described above.

While the method 400 is illustrated with conductive lines being patterned from both of the alternating lines and materials, followed by vias being patterned from one or both of the alternating lines materials, this order is not required. Rather, conductive lines can be patterned from one of the alternating lines and materials, followed by vias from that line and material, followed by conductive lines from the other of the materials and then vias from that other material. Furthermore, while particular types of processing operations have been described, the techniques described herein can be performed through some other types of operations or with operations performed in a different manner. Thus, no particular type of hard mask or soft mask or particular types of materials used are required other than use of at least two fill materials having different etch characteristics.

With exemplary methods enabling self-aligned metal cuts and vias set forth, as well as exemplary semiconductor dies and interconnects, the discussion turns to an exemplary electronic device by which the techniques can be implemented, such as a device used to fabricate interconnects for ICs.

Figure 25:
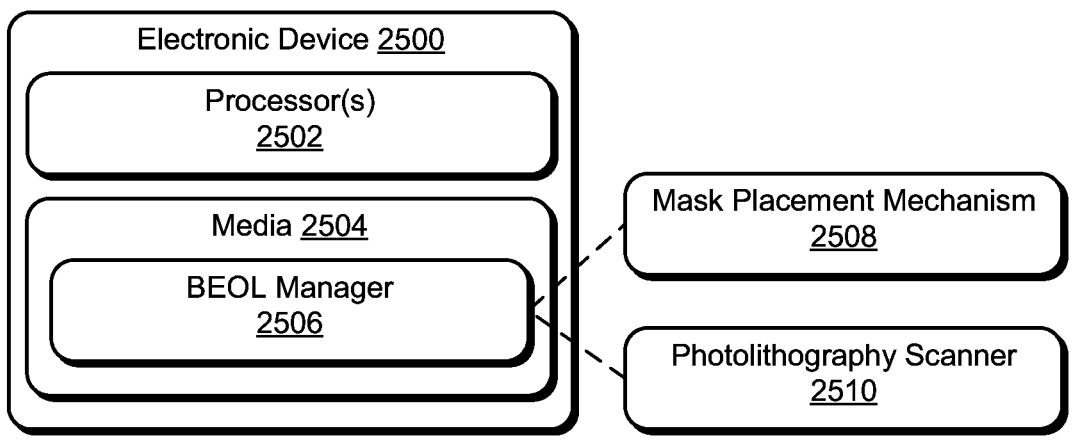
FIG. 25 illustrates an exemplary electronic device in which techniques enabling self-aligned metal cuts and vias may be implemented.

FIG. 25 illustrates an electronic device 2500 having one or more computer processors 2502 and computer-readable storage media ("media") 2504. The media 2504 includes or has access to a BEOL manager 2506. The BEOL manager 2506 manages at least a portion of the BEOL processing in which interconnections to semiconductor dies can be performed, and is one example of a means for managing noted below. The BEOL manager 2506 can include computer-executable instructions stored on the media 2504, though it may also or instead be performed through hardware circuitry. The BEOL manager 2506 controls a mask placement mechanism 2508 and a photolithography scanner 2510. This control can include when and where a mask and wafer are placed, including relative to one or the other, as well as when and for how long light is emitted by the photolithography scanner 2510. In the case of software, the BEOL manager 2506 follows process instructions executed by the one or more computer processors 2502 effective to command, direct, and regulate behavior of the mask placement mechanism 2508 and the photolithography scanner 2510. These process instructions may include advanced timing and movement controls, such as proportional-integral-derivative (PID) control acting as a control loop feedback mechanism, learning control using PID as a beginning point, fuzzy logic control, and even linear control, as non-limiting examples. While not required, this control can be performed through programmable logic controllers (PLCs), field-programmable gate arrays (FPGAs), or microcontrollers, as non-limiting examples.

Generally, the BEOL manager 2506 is configured to form metal cuts or vias using holes or transparencies in a photolithography mask where the holes or transparencies have an overlay margin that overlaps neighboring lines. In some cases, the overlay margin permitted by the techniques and managed by the BEOL manager 2506 are half or more of a pitch of lines from which the metal cuts or vias will later be formed. If a spacer material between the lines, however, is narrower than half of the pitch, the overlay margin is even less, and therefore the techniques are further applicable, as overlap of the spacer material to an adjacent line is more likely. The permitted overlay margin can be larger than a sum of the maximum placement-accuracy value and the maximum scanner-accuracy value, as noted in detail below. The BEOL manager 2506, responsive to execution by the processors 2502, may perform one or more of the operations set forth for the method 400 above.

The electronic device 2500 may include, or be configured to control remotely, the mask placement mechanism 2508, the photolithography scanner 2510, and other automated or robotic systems of a BEOL processing line. The mask placement mechanism 2508 can be of various types and is but one example of a means for placing a mask noted below. In more detail, the mask placement mechanism 2508 may include robotic systems. These robotic systems move a wafer or a mask (e.g., a wafer stage or a reticle stage) relative to one or the other, such as in opposite directions to each other, between various stages of exposure by the photolithography scanner 2510. These robotic systems are configured to receive instructions from the BEOL manager 2506, though these instructions can be to control movement of the robotic systems or instead command end results, such as to move a mask to a particular location. In cases where the commands are not for full control of movement, the robotic systems may include control systems, such as PLCs, microcontrollers, or computer-executable instructions of higher complexity. Whether moving one or both of a wafer and mask, the mask placement mechanism 2508 may have, in one or multiple dimensions, a maximum placement-accuracy value at which the mask placement mechanism 2508 is capable of placing a photolithography mask. This placement accuracy affects fabrication generally, and especially at advanced nodes, lines, or interconnects. Some advanced mask placement mechanisms are capable of accuracy to six (6) nm, and in some cases even greater accuracy. At advanced nodes, such as 14, 10, and 7 nanometers, this accuracy is often not sufficient for some desired processing.

The photolithography scanner 2510 can be of various types, each of which has some limitation on accuracy, whether a fundamental limit or otherwise. Thus, the photolithography scanner 2510 has some maximum scanner-accuracy value at which the photolithography scanner 2510 is capable of patterning a resist through holes or transparencies in the photolithography mask. For advanced nodes, the photolithography scanner 2510 may include a 193 nanometer laser, such as one using immersion techniques (e.g., 193i), extreme ultraviolet (EUV), 157 nanometer, X-ray, electron, and ion lasers. The photolithography scanner 2510 is but one example of a means for scanning noted below.

For one particular example, assume that the mask placement mechanism 2508 has a maximum placement-accuracy value of six (6) nm and that the photolithography scanner 2510 has a maximum scanner-accuracy value of nine (9) nm. This results in a sum of 15 nm, which is the best that this particular example can achieve for photolithography. Because of this, the overlay margin, absent the self-aligned techniques described herein, would be at least 15 nm. As noted above, however, a 15 nm overlay margin is insufficient at advanced nodes.

The electronic device 2500 may be a mobile or fixed device, such as a portion of a semiconductor fabrication plant. Examples include a server computer, a network switch or router, a blade of a data center, a personal computer, or a desktop computer. The processors 2502 can be single or multi-core processors. The media 2504 may include one or more memory devices that enable persistent and/or non-transitory data storage (i.e., in contrast to mere signal transmission), examples of which include random access memory (RAM), nonvolatile memory (e.g., any of one or more of a read-only memory (ROM), flash memory, EPROM, EEPROM), and a disk storage device. A disk storage device may be implemented as any type of magnetic or optical storage device, such as a hard disk drive, a recordable and/or rewriteable compact disc (CD), any type of a digital versatile disc (DVD), and the like.

Unless context dictates otherwise, use herein of the word "or" may be considered use of an "inclusive or," or a term that permits inclusion or application of one or more items that are linked by the word "or" (e.g., a phrase "X or Y" may be interpreted as permitting just "X," as permitting just "Y," or as permitting both "X" and "Y"). Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A method for providing a metallic interconnection layer of a semiconductor die, comprising:
    patterning and filling, using a two-dimension-capable multi-patterning process, alternating first and second sets of lines, the first set of lines and the second set of lines having first and second materials, respectively, the first and second materials having different etch characteristics;
    patterning first self-aligned cuts for the first set of lines, the first self-aligned cuts having an overlay margin permitting the first self-aligned cuts to overlap one or more neighboring lines of the second set of lines;
    selectively etching, due to the first and second materials having different etch characteristics, the first and second sets of lines and the first self-aligned cuts to remove the first set of lines other than portions of the first set of lines protected by the first self-aligned cuts but not the second set of lines and to provide first trenches at the first set of lines other than the portions of the first set of lines protected by the first self-aligned cuts;
    filling the first trenches with a third material having different etch characteristics than the second material;
    patterning second self-aligned cuts for the second set of lines, the second self-aligned cuts having an overlay margin permitting the second self-aligned cuts to overlap one or more neighboring trenches of the first trenches;
    selectively etching, due to the second and third materials having different etch characteristics, the second set of lines, the first trenches, and the second self-aligned cuts to remove the second set of lines other than portions of the second set of lines protected by the second self-aligned cuts but not the first trenches and to provide second trenches at the second set of lines other than the portions of the second set of lines protected by the second self-aligned cuts;
    filling the second trenches with a fourth material having different etch characteristics than the third material;
    patterning first self-aligned vias for the first or second trenches with a relaxed overlay margin, the relaxed overlay margin permitting the first self-aligned vias to overlap one or more neighboring trenches of the first or second trenches;
    selectively etching, due to the first and second trenches having the third and fourth materials having different etch characteristics, to provide first via holes;
    stripping fill materials in the first and second trenches to provide a stripped pattern; and
    forming conductive lines and vias in the stripped pattern to provide the metallic interconnection layer for the semiconductor die.

2. The method of claim 1, wherein the two-dimension-capable multi-patterning process is a Lithography Etch Lithography Etch (LELE) process.

3. The method of claim 1, wherein patterning and filling the alternating first and second sets of lines of the first and second materials having different etch characteristics comprises:
    patterning a first hard mask stack to provide a first set of line stores;
    filling the first set of line stores with the first material of the first and second materials having different etch characteristics;
    patterning a second hard mask stack to provide a second set of line stores alternating with the first set of line stores; and
    filling the second set of line stores with the second material of the first and second materials having different etch characteristics.

4. The method of claim 1, wherein the first set of lines has a different height or width than the second set of lines, the first set of lines and the second set of lines alternating one with another.

5. The method of claim 1, further comprising, after filling the second trenches and prior to patterning the first self-aligned vias, planarizing the semiconductor die to expose a cut pattern of the first and second trenches.

6. The method of claim 1, wherein selectively etching the first and second sets of lines and the first self-aligned cuts is performed in two etching steps, each of the two etching steps having different etchants.

7. The method of claim 1, wherein selectively etching the second set of lines, the first trenches, and the second self-aligned cuts is performed in two etching steps, each of the two etching steps having different etchants.

8. The method of claim 1, wherein forming the conductive lines and vias in the stripped pattern includes metallization of the stripped pattern with copper.

9. The method of claim 1, further comprising:
patterning second self-aligned vias for the first or second trenches with a second relaxed overlay margin, the second relaxed overlay margin permitting the second self-aligned vias to overlap one or more neighboring trenches of the first or second trenches;
selectively etching, due to the first and second trenches having the third and fourth materials having different etch characteristics, to provide second via holes; and
forming the conductive lines and vias at the second via holes.

10. The method of claim 1, wherein a pitch of the alternating first and second sets of lines is about 24 nanometers.

11. The method of claim 1, wherein patterning operations use a scanner operating at about 193 nanometers and following immersion techniques.

12. One or more non-transitory computer-readable storage media having instructions stored thereon that, responsive to execution by one or more computer processors, performs operations comprising:
patterning and filling, using a two-dimension-capable multi-patterning process, alternating first and second sets of lines, the first set of lines and the second set of lines having first and second materials, respectively, the first and second materials having different etch characteristics;
patterning first self-aligned cuts for the first set of lines, the first self-aligned cuts having an overlay margin permitting the first self-aligned cuts to overlap one or more neighboring lines of the second set of lines;
selectively etching, due to the first and second materials having different etch characteristics, the first and second sets of lines and the first self-aligned cuts to remove the first set of lines other than portions of the first set of lines protected by the first self-aligned cuts but not the second set of lines and to provide first trenches at the first set of lines other than the portions of the first set of lines protected by the first self-aligned cuts;
filling the first trenches with a third material having different etch characteristics than the second material;
patterning second self-aligned cuts for the second set of lines, the second self-aligned cuts having an overlay margin permitting the second self-aligned cuts to overlap one or more neighboring trenches of the first trenches;
selectively etching, due to the second and third materials having different etch characteristics, the second set of lines, the first trenches, and the second self-aligned cuts to remove the second set of lines other than portions of the second set of lines protected by the second self-aligned cuts but not the first trenches and to provide second trenches at the second set of lines other than the portions of the second set of lines protected by the second self-aligned cuts;
filling the second trenches with a fourth material having different etch characteristics than the third material;
patterning first self-aligned vias for the first or second trenches with a relaxed overlay margin, the relaxed overlay margin permitting the first self-aligned vias to overlap one or more neighboring trenches of the first or second trenches;
selectively etching, due to the first and second trenches having the third and fourth materials having different etch characteristics, to provide first via holes;
stripping fill materials in the first and second trenches to provide a stripped pattern; and
forming conductive lines and vias in the stripped pattern to provide a metallic interconnection layer for a semiconductor die.

13. The one or more non-transitory computer-readable storage media of claim 12, wherein patterning and filling the alternating first and second sets of lines of the first and second materials having different etch characteristics comprises:
patterning a first hard mask stack to provide a first set of line stores;
filling the first set of line stores with the first material of the first and second materials having different etch characteristics;
patterning a second hard mask stack to provide a second set of line stores alternating with the first set of line stores; and
filling the second set of line stores with the second material of the first and second materials having different etch characteristics.

14. The one or more non-transitory computer-readable storage media of claim 12, the operations further comprising:
patterning second self-aligned vias for the first or second trenches with a second relaxed overlay margin, the second relaxed overlay margin permitting the second self-aligned vias to overlap one or more neighboring trenches of the first or second trenches;
selectively etching, due to the first and second trenches having the third and fourth materials having different etch characteristics, to provide second via holes; and
forming the conductive lines and vias at the second via holes.

15. The one or more non-transitory computer-readable storage media of claim 12, wherein the first set of lines has a different height or width than the second set of lines, the first set of lines and the second set of lines alternating one with another.

16. The one or more non-transitory computer-readable storage media of claim 12, wherein the operations further comprise, after filling the second trenches and prior to patterning the first self-aligned vias, planarizing the semiconductor die to expose a cut pattern of the first and second trenches.

17. The one or more non-transitory computer-readable storage media of claim 12, wherein selectively etching the first and second sets of lines and the first self-aligned cuts is performed in two etching steps, each of the two etching steps having different etchants.

18. The one or more non-transitory computer-readable storage media of claim 12, wherein selectively etching the second set of lines, the first trenches, and the second self-aligned cuts is performed in two etching steps, each of the two etching steps having different etchants.

19. The one or more non-transitory computer-readable storage media of claim 12, wherein forming the conductive lines and vias in the stripped pattern includes metallization of the stripped pattern with copper.

* * * * *